(12) United States Patent
Nishii

(10) Patent No.: US 11,234,356 B2
(45) Date of Patent: Feb. 1, 2022

(54) TRAVELING ROUTE SETTING DEVICE

(71) Applicant: Yanmar Power Technology Co., Ltd., Osaka (JP)

(72) Inventor: Yasuto Nishii, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 44 days.

(21) Appl. No.: 16/766,715

(22) PCT Filed: Oct. 22, 2018

(86) PCT No.: PCT/JP2018/039239
§ 371 (c)(1),
(2) Date: May 25, 2020

(87) PCT Pub. No.: WO2019/111563
PCT Pub. Date: Jun. 13, 2019

(65) Prior Publication Data
US 2020/0288622 A1    Sep. 17, 2020

(30) Foreign Application Priority Data
Dec. 7, 2017   (JP) .............................. JP2017-235218

(51) Int. Cl.
*A01B 69/00*      (2006.01)
*A01B 69/04*      (2006.01)
*G05D 1/02*       (2020.01)

(52) U.S. Cl.
CPC ......... *A01B 69/008* (2013.01); *G05D 1/0219* (2013.01); *G05D 2201/0201* (2013.01)

(58) Field of Classification Search
CPC .................................................... A01B 69/008
See application file for complete search history.

(56) References Cited

U.S. PATENT DOCUMENTS 10,053,095 B2 *   8/2018  Habu ................... G05D 1/0246
10,754,342 B2 *   8/2020  Tomita ................. G05D 1/0274
2005/0273253 A1 * 12/2005  Diekhans ............... G01C 21/20
                                                            701/50

(Continued)

FOREIGN PATENT DOCUMENTS

JP          2017139982 A  *  8/2017

*Primary Examiner* — Shelley Chen
(74) *Attorney, Agent, or Firm* — Chris Mizumoto

(57) ABSTRACT

Provided are a work region setting portion which sets, within a traveling region, a work region for a working vehicle to perform predetermined work; and a traveling route setting portion which sets, within the traveling region, a target traveling route to make the working vehicle travel automatically. The traveling route setting portion includes: an initial route generation portion which generates an initial route based on a trajectory formed by the working vehicle traveling in the traveling region; a work route generation portion which generates work routes arranged in a parallel arrangement direction orthogonal to an extension direction; and a connection route generation portion which generates connection routes connecting, at either side of the work region, routes adjacent in the parallel arrangement direction among the initial route and the work routes. The target traveling route including the initial route, the work routes, and the connection routes is thereby set.

2 Claims, 11 Drawing Sheets

(56) References Cited

U.S. PATENT DOCUMENTS

| | | | |
|---|---|---|---|
| 2010/0217516 A1* | 8/2010 | Diekhans | A01B 69/007 |
| | | | 701/533 |
| 2017/0066444 A1* | 3/2017 | Habu | B60W 30/12 |
| 2017/0322559 A1* | 11/2017 | Fukuda | G05D 1/0088 |
| 2018/0011495 A1* | 1/2018 | Sakaguchi | A01B 69/008 |
| 2018/0024563 A1* | 1/2018 | Matsuzaki | G01C 21/3461 |
| | | | 701/41 |
| 2018/0113471 A1* | 4/2018 | Sakaguchi | G01C 21/34 |
| 2018/0136664 A1* | 5/2018 | Tomita | G05D 1/027 |
| 2018/0326986 A1* | 11/2018 | Habu | G05D 1/0257 |
| 2019/0146513 A1* | 5/2019 | Tomita | G05D 1/0278 |
| | | | 701/50 |
| 2020/0064144 A1* | 2/2020 | Tomita | G05D 1/0212 |
| 2020/0064863 A1* | 2/2020 | Tomita | G05D 1/0289 |

* cited by examiner

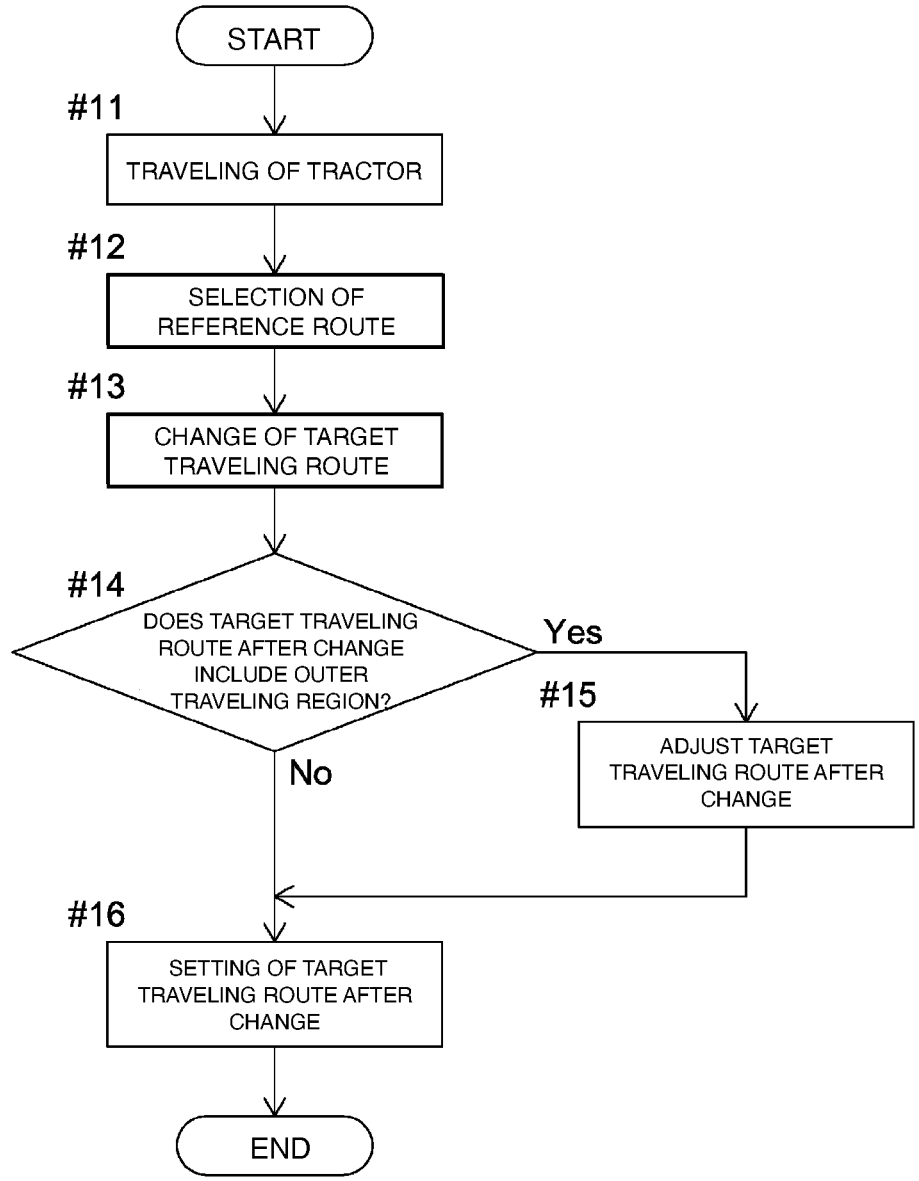

TRAVELING ROUTE SETTING DEVICE

CROSS-REFERENCE

This application is a national phase of an international application, PCT/JP2018/039239 filed on Oct. 22, 2018, which claims the benefit of Japanese Application No. 2017-235218 filed on Dec. 7, 2017.

TECHNICAL FIELD

The present invention relates to a traveling route setting device which sets a target traveling route for making a working vehicle travel automatically.

BACKGROUND ART

The traveling route setting device mentioned above is used for an automatic traveling system which acquires the current position of a working vehicle by using a satellite positioning system, and makes the working vehicle automatically travel along a target traveling route which has been set by the traveling route setting device (for example, see Patent Literature 1).

With the device described in the aforementioned Patent Literature 1, as various kinds of information, such as the type of the working vehicle, and the type and width of a working machine to be mounted to the working vehicle, are input to a remote manipulator such as a personal computer, a plurality of candidate target traveling routes are generated within a traveling region such as a farm field, and the generated candidate target traveling routes are set to be displayable on a display portion such as a touch panel. The candidate target traveling route includes, for example, a plurality of straight routes arranged in parallel to each other, and a plurality of curved routes connecting the straight routes adjacent to each other.

In setting the target traveling route, if the candidate target traveling route displayed on the display portion of the remote manipulator is satisfactory, the user operates a determination button, thereby setting the candidate target traveling route displayed on the display portion as a target traveling route. Further, if the user wishes to adopt a different candidate target traveling route, the user operates a resetting button to make a selection from the plurality of candidate target traveling routes, thereby setting the selected candidate target traveling route as the target traveling route.

CITATION LIST

Patent Literature

Patent Literature 1: JP 2016-93125 A

DISCLOSURE OF INVENTION

Problems to be Solved by the Invention

In the device described in Patent Literature 1, any one of the candidate target traveling routes generated by the remote manipulator is set as the target traveling route. However, the candidate target traveling routes are generated on the basis of the various kinds of information such as the type of the working vehicle, and the type and width of the working machine to be mounted to the working vehicle, and the user's requests are not reflected therein. Consequently, the position, the angle, and the like, of the target traveling route may be deviated as compared to the route where the user actually wishes to perform the work, and the target traveling route according to the user's request may not be set.

In view of the actual circumstances as described above, the main object of the present invention is to provide a traveling route setting device capable of setting a target traveling route according to the user's request.

Means for Solving the Problems

The first characteristic configuration of the present invention is featured in that the present invention is provided with:

a work region setting portion which sets, within a traveling region, a work region for a working vehicle to perform predetermined work; and a traveling route setting portion which sets, within the traveling region, a target traveling route for travel guidance to make the working vehicle travel automatically, in which the traveling route setting portion includes:

an initial route generation portion which generates an initial route based on a traveling trajectory formed by traveling of the working vehicle within the traveling region;

a work route generation portion which generates, based on the initial route, a plurality of work routes arranged in a state of being parallel to the initial route in a parallel arrangement direction orthogonal to a traveling direction of the initial route; and a connection route generation portion which generates a plurality of connection routes each connecting, at one end side or the other end side of the work region, routes adjacent to each other in the parallel arrangement direction among the initial route and the plurality of work routes, and the target traveling route including the initial route, the plurality of work routes, and the plurality of connection routes is set.

According to the present configuration, when the working vehicle is made to travel by a driving operation of a user or the like over a place where the predetermined work needs to be performed within the traveling region, the initial route generation portion generates the initial route based on the traveling trajectory formed by the traveling of the working vehicle. When the initial route generation portion generates the initial route, the work route generation portion generates the plurality of work routes on the basis of the initial route, and the connection route generation portion generates the plurality of connection routes on the basis of the initial route and the plurality of work routes. Therefore, the traveling route setting portion can set the target traveling route including the initial route, the plurality of work routes, and the plurality of connection routes. In this way, as the initial route is generated in accordance with the place where the user or the like wishes to perform the predetermined work, not only the initial route but also the plurality of work routes become the routes according to the request of the user or the like. Thus, the target traveling route according to the user's request can be set.

The second characteristic configuration of the present invention is featured in that the work route generation portion generates an extended route by extending the initial route within the work region, and generates the plurality of work routes arranged in a state of being parallel to the extended route in the parallel arrangement direction.

According to the present configuration, the work route generation portion generates the extended route by extending the initial route within the work region, and generates the plurality of work routes corresponding to the extended route. Therefore, in a case where the user or the likes makes the working vehicle travel, even if the traveling distance becomes short due to the working vehicle being made to only partially travel within the work region, for example, the extended route and the plurality of work routes spreading over the entire work region can be generated. Consequently, it is possible to set the target traveling route along which the predetermined work can be performed over the entire work region, while simplifying the work of making the working vehicle travel by the user or the like.

The third characteristic configuration of the present invention is featured in that the present invention is provided with a route exclusion portion which excludes a route located outside the work region, among the initial route and the plurality of work routes, from the target traveling route.

According to the present configuration, the route exclusion portion excludes the route located outside the work region, among the initial route and the plurality of work routes, from the target traveling route. Therefore, it is possible to prevent the initial route or the work routes from existing outside the work region. Therefore, it is possible to limit the place where the working vehicle performs the predetermined work to be within the work region, and it is possible to set the target traveling route along which the predetermined work can be performed appropriately.

The fourth characteristic configuration of the present invention is featured in that the present invention is provided with:

a traveling route setting portion which sets, within a traveling region, a target traveling route for travel guidance to make a working vehicle travel automatically, the traveling route setting portion setting the target traveling route including: a plurality of work routes extending in a traveling direction and arranged in a state of being parallel to each other in a parallel arrangement direction orthogonal to the traveling direction; and a plurality of connection routes each connecting an end edge and a start edge of the work routes that are adjacent to each other in the parallel arrangement direction, among the plurality of work routes;

a reference route selection portion which selects a part of the plurality of work routes as a reference route;

a traveling trajectory acquisition portion which acquires a traveling trajectory to be formed when the working vehicle is made to travel within the traveling region; and a traveling route changing portion which changes the target traveling route so that the reference route conforms to the traveling trajectory.

In a state in which the target traveling route is set by the traveling route setting portion, due to change of a work condition or the other conditions, for example, there may be a case where the user or the like wishes to change the target traveling route set by the traveling route setting portion. In view of the above, according to the present configuration, the target traveling route is changed by providing the reference route selection portion, the traveling trajectory acquisition portion, and the traveling route changing portion.

In the case of changing the target traveling route, when the working vehicle is made to travel by a driving operation of the user or the like over a place where the user or the like wishes to perform the predetermined work within the traveling region, the traveling trajectory acquisition portion acquires the traveling trajectory at that time. The reference route selection portion selects a part of the plurality of work routes as the reference route in the target traveling route set by the traveling route setting portion. Therefore, the reference route selection portion can select the reference route on the basis of the selection made by the user or the like. When the traveling trajectory acquisition portion acquires the traveling trajectory, and the reference route selection portion selects the reference route, the traveling route changing portion changes the target traveling route so that the reference route conforms to the traveling trajectory.

The traveling trajectory is a traveling trajectory formed when traveling is performed over a place where the user or the like wishes to perform the predetermined work within the traveling region. As the traveling route changing portion changes the target traveling route in accordance with the traveling trajectory, in the target traveling route after change, not only is the reference route changed to a route according to the request of the user or the like, but the other work routes are also changed to routes according to the request of the user or the like. Accordingly, by merely acquiring the traveling trajectory to be applied as a target of change for the reference route, the entire target traveling route can be changed according to the request of the user or the like. That is, it is possible to change the target traveling route to one according to the request of the user or the like, while simplifying the structure for changing the target traveling route.

The fifth characteristic configuration of the present invention is featured in that if the traveling trajectory acquired by the traveling trajectory acquisition portion is shorter than the reference route in length, the traveling route changing portion reduces the lengths of the reference route and the plurality of work routes so that start and end edges of the reference route match with start and end edges of the traveling trajectory, and moves the target traveling route.

It is considered that the length of the traveling trajectory acquired by the traveling trajectory acquisition portion is the length of the route along which the user or the like wishes to perform the predetermined work. Therefore, according to the present configuration, if the traveling trajectory is shorter than the reference route in length, the traveling route changing portion reduces the lengths of the reference route and the plurality of work routes so that the start and end edges of the reference route match with the start and end edges of the traveling trajectory, and moves the target traveling route. In this way, since the target traveling route can be changed in accordance with the length of the route along which the user or the like wishes to perform the predetermined work, it is possible to adequately respond to the request of the user or the like.

The sixth characteristic configuration of the present invention is featured in that if the shape of the traveling trajectory acquired by the traveling trajectory acquisition portion is different from the shape of the reference route, the traveling route changing portion moves the target traveling route such that the reference route conforms to the traveling trajectory in a state of performing shape alteration to conform the shape of the reference route and the shapes of the plurality of work routes to the shape of the traveling trajectory.

For example, when there is a discrepancy between the shape of the work route in the target traveling route set by the traveling route setting portion and the shape of the route along which the user or the like wishes to perform the predetermined work, a difference may be caused between the shape of the traveling trajectory and the shape of the reference route. Also in such a case, the traveling route changing portion moves the target traveling route such that the reference route conforms to the traveling trajectory in a state of performing shape alteration to conform the shape of the reference route and the shapes of the plurality of work routes to the shape of the traveling trajectory. In this way, since the target traveling route can be changed while altering the shapes of the reference route and the other work routes in accordance with the shape of the route along which the user or the like wishes to perform the predetermined work, it is possible to adequately respond to the request of the user or the like.

The seventh characteristic configuration of the present invention is featured in that the present invention is provided with:

a traveling route setting portion which sets, within a traveling region, a target traveling route for travel guidance to make a working vehicle travel automatically, the traveling route setting portion setting the target traveling route including: a plurality of work routes extending in a traveling direction and arranged in a state of being parallel to each other in a parallel arrangement direction orthogonal to the traveling direction; and a plurality of connection routes each connecting an end edge and a start edge of the work routes that are adjacent to each other in the parallel arrangement direction, among the plurality of work routes;

a reference route selection portion which selects a part of the plurality of work routes as a reference route;

a travel stop position acquisition portion which acquires a stopped position of the working vehicle within the traveling region; and a traveling route changing portion which changes the target traveling route such that a start edge or an end edge of the reference route matches with the stopped position.

According to the present configuration, when the user or the like stops traveling of the working vehicle at a place where the user or the like wishes to start or end the predetermined work within the traveling region, the travel stop position acquisition portion acquires the stopped position of the working vehicle at that time. The reference route selection portion selects a part of the plurality of work routes as the reference route in the target traveling route set by the traveling route setting portion. Therefore, the reference route selection portion can select the reference route on the basis of the selection made by the user or the like. When the travel stop position acquisition portion acquires the stopped position, and the reference route selection portion selects the reference route, the traveling route changing portion changes the target traveling route so that the start edge or the end edge of the reference route matches with the stopped position.

The stopped position of the working vehicle is a place where the user or the like wishes to start or end the predetermined work within the traveling region. As the traveling route changing portion changes the target traveling route according to the stopped position, the target traveling route after change becomes a route having the start edge or the end edge according to the request of the user or the like. Accordingly, even in a state where the target traveling route is set by the traveling route setting portion, by merely stopping the traveling of the working vehicle at the place where the user or the like wishes to start or end the predetermined work, the target traveling route can be changed to one according to the request of the user or the like.

The eighth characteristic configuration of the present invention is featured in that the present invention is provided with a traveling route adjusting portion which deletes, when the target traveling route is changed by the traveling route changing portion, a route, which is located outside the traveling region, of the target traveling route after change, and adds the deleted route to the target traveling route after change within the traveling region.

By making the working vehicle travel over a place, etc., where the user or the like wishes to perform the predetermined work, the target traveling route is changed by the traveling route changing portion. Accordingly, depending on how the target traveling route is changed by the traveling route changing portion, there may be a case where a route located outside the traveling region exists in the target traveling route after change. Therefore, according to the present configuration, as the traveling route adjusting portion is provided, the traveling route adjusting portion deletes the route located outside the traveling region from the target traveling route after change. Thus, it is possible to prevent the working vehicle from running outside the traveling region. Moreover, not only does the traveling route adjusting portion delete the route located outside the traveling region, but it also adds the route in question to the target traveling route after change within the traveling region. Therefore, the target traveling route can be set over the entire traveling region.

BRIEF DESCRIPTION OF DRAWINGS

FIG. 18 is a flowchart concerning change of the target traveling route.

DESCRIPTION OF EMBODIMENTS

An embodiment of an automatic traveling system using a traveling route setting device according to the present invention will be described referring to the accompanying drawings.

Figure 1:
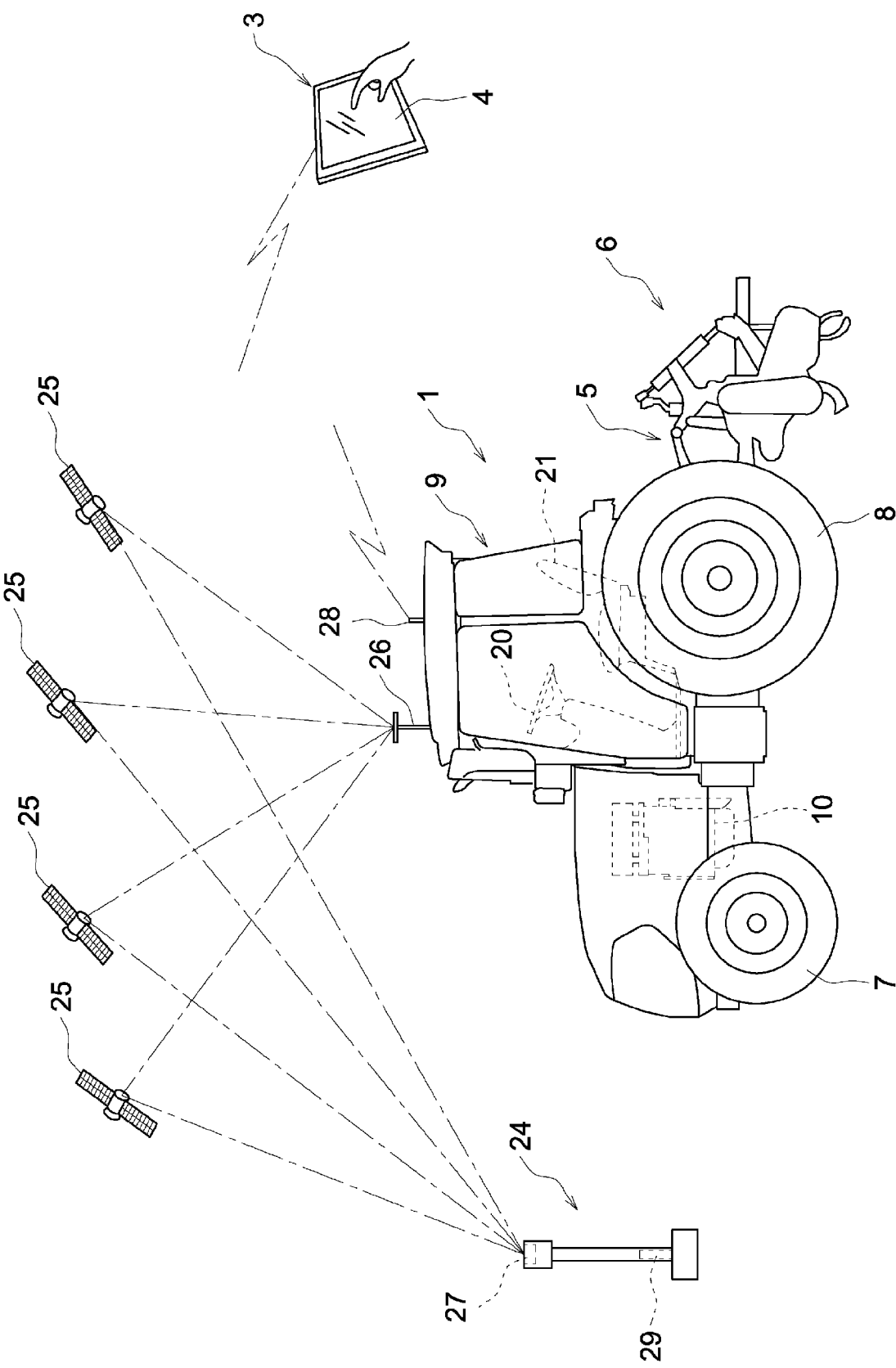
FIG. 1 is an illustration showing a schematic configuration of an automatic traveling system.

As shown in FIG. 1, in the automatic traveling system, a tractor 1 is applied as a working vehicle. However, the automatic traveling system can be applied to riding type working vehicles such as a riding type rice transplanter, a combine harvester, a riding type mower, a wheel loader, and a snowplow, and unmanned working vehicles such as an unmanned mower, other than the tractors.

Figure 2:
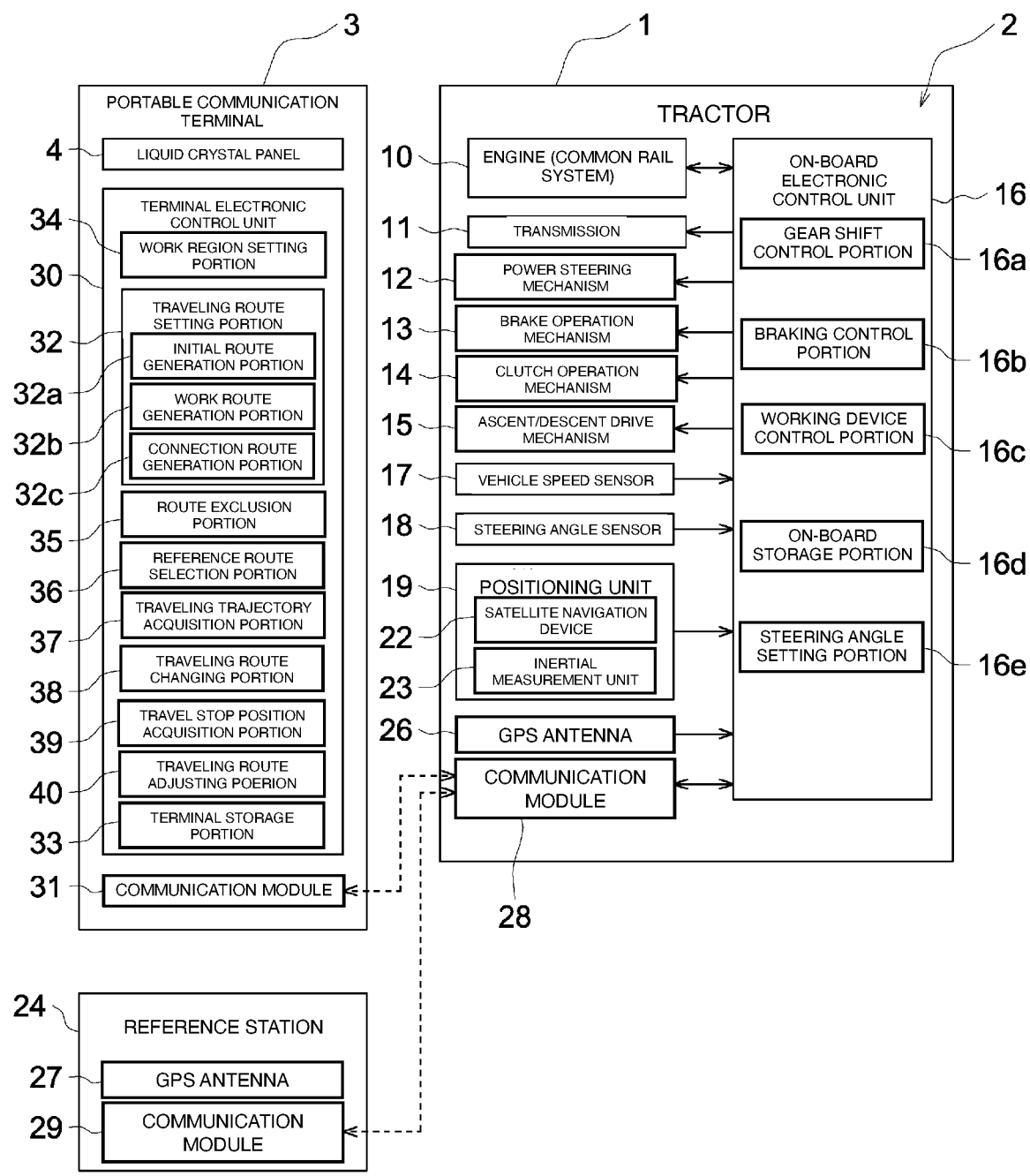
FIG. 2 is a block diagram showing a schematic configuration of the automatic traveling system.

As shown in FIGS. 1 and 2, the automatic traveling system is provided with an automatic traveling unit 2 mounted to the tractor 1, and a portable communication terminal 3 set to be capable of performing communication with the automatic traveling unit 2. For the portable communication terminal 3, a tablet type personal computer or a smart phone, etc., having a liquid crystal panel 4 or the like on which touch operation is possible can be employed.

As shown in FIG. 1, the tractor 1 is configured to be of a rotary cultivation specification that is realized as a rotary cultivator device 6, which is an example of a working device, is coupled to the rear part of the tractor 1 via a three-point link mechanism 5, such that the rotary cultivator device 6 can be moved up and down and also be rolled. At the rear part of the tractor 1, a working device such as a plow, a seeding device, or a spraying device can be coupled, instead of the rotary cultivator device 6.

As shown in FIG. 1, the tractor 1 is provided with left and right front wheels 7 serving as drivable steering wheels; drivable left and right rear wheels 8; a cabin 9 forming a boarding type driving portion; and an electronically controlled diesel engine (hereinafter referred to as an engine) 10 including a common rail system. Also, as shown in FIG. 2, the tractor 1 is provided with, for example, an electronically controlled transmission 11 which shifts power from the engine 10; a fully hydraulic power steering mechanism 12 which steers the left and right front wheels 7; left and right side brakes (not shown) which apply brakes on the left and right rear wheels 8; an electronically controlled brake operation mechanism 13 which enables a hydraulic operation of the left and right side brakes; a working clutch (not shown) which intermittently transmits power to the rotary cultivator device 6; an electronically controlled clutch operation mechanism 14 which enables a hydraulic operation of the working clutch; an electrohydraulically controlled ascent/descent drive mechanism 15 which drives the rotary cultivator device 6 to move up and down; an on-board electronic control unit 16 which includes various control programs related to automatic traveling or the like of the tractor 1; a vehicle speed sensor 17 which detects the vehicle speed of the tractor 1; a steering angle sensor 18 which detects the steering angle of the front wheels 7; and a positioning unit 19 which measures the current position and the current orientation of the tractor 1.

Alternatively, for the engine 10, an electronically controlled gasoline engine equipped with an electronic governor may be adopted. For the transmission 11, a hydromechanical continuously variable transmission (HMT), a hydrostatic continuously variable transmission (HST), or a belt-type continuously variable transmission, etc., can be employed. For the power steering mechanism 12, an electrically operated power steering mechanism 12 equipped with an electric motor, for example, may be employed.

As shown in FIG. 1, inside the cabin 9, a steering wheel 20 which enables manual steering of the left and right front wheels 7 via the power steering mechanism 12, and a seat 21 for the user are provided. Also, although not shown in the drawing, a gear shift lever which enables a manual operation of the transmission 11, left and right brake pedals which enable a man-caused operation of the left and right side brakes, and an ascent/descent lever which enables a manual ascent/descent operation of the rotary cultivator device 6, etc., are provided.

As shown in FIG. 2, the on-board electronic control unit 16 includes, for example, a gear shift control portion 16a which controls the actuation of the transmission 11; a braking control portion 16b which controls the actuation of the left and right side brakes; a working device control portion 16c which controls the actuation of the rotary cultivator device 6; a nonvolatile on-board storage portion 16d which stores, for example, a target traveling route P for automatic traveling (for example, see FIG. 5) which has been set in advance; and a steering angle setting portion 16e which sets a target steering angle of the left and right front wheels 7 at the time of automatic traveling, and outputs the same to the power steering mechanism 12.

As shown in FIGS. 1 and 2, the positioning unit 19 is provided with, for example, a satellite navigation device 22, which measures the current position and the current orientation of the tractor 1 by using a GPS (Global Positioning System), which is an example of a global navigation satellite system (GNSS:Global Navigation Satellite System); and an inertial measurement unit (IMU:Inertial Measurement Unit) 23, which has a three-axis gyroscope and a three-direction acceleration sensor, etc., and measures the attitude, the orientation, and the like, of the tractor 1. A positioning method using the GPS includes a DGPS (Differential GPS: relative positioning method), and an RTK-GPS (Real Time Kinematic GPS: interference positioning method). In the present embodiment, the RTK-GPS which is suitable for measuring the position of a movable body is employed. Accordingly, a reference station 24 which enables positioning by the RTK-GPS is installed at a known location in the periphery of a farm field.

GPS antennas 26 and 27 which receive radio waves transmitted from a GPS satellite 25, and communication modules 28 and 29 which enable wireless communication of various kinds of data including positioning data between the tractor 1 and the reference station 24 are provided for the tractor 1 and the reference station 24, respectively. Consequently, the satellite navigation device 22 can measure the current position and the current orientation of the tractor 1 with high accuracy, on the basis of the positioning data obtained by the GPS antenna 26 on the tractor side by receipt of the radio waves from the GPS satellite 25, and the positioning data obtained by the GPS antenna 27 on the base station side by receipt of the radio waves from the GPS satellite 25. Also, as the positioning unit 19 is provided with the satellite navigation device 22 and the inertial measurement unit 23, the current position, the current orientation, and an attitude angle (yaw angle, roll angle, pitch angle) of the tractor 1 can be measured with high accuracy.

As shown in FIG. 2, the portable communication terminal 3 is provided with, for example, a terminal electronic control unit 30 including various control programs for controlling the actuation of the liquid crystal panel 4, etc., and a communication module 31 which enables wireless communication of various kinds of data including the positioning data with the communication module 28 on the tractor side. The terminal electronic control unit 30 includes, for example, a traveling route setting portion 32 which sets the target traveling route P for travel guidance (for example, see FIG. 5) for making the tractor 1 travel automatically, and a nonvolatile terminal storage portion 33 in which various kinds of input data input by the user, the target traveling route P set by the traveling route setting portion 32, and the like, are stored.

The traveling route setting portion 32 sets the target traveling route P (for example, see FIG. 5) within a traveling region S. The way in which the target traveling route P is set will be described later. The target traveling route P set by the traveling route setting portion 32 can be displayed on the liquid crystal panel 4, and is stored in the terminal storage portion 33 as route data that is associated with car body data, farm field data, and the like. The route data includes, for example, an azimuth angle of the target traveling route P, and a target engine speed of revolution and a target vehicle speed that have been set according to the traveling mode or the like of the tractor 1 on the target traveling route P.

In this way, when the traveling route setting portion 32 sets the target traveling route P, the on-board electronic control unit 16 of the tractor 1 can acquire the route data as the terminal electronic control unit 30 transfers the route data from the portable communication terminal 3 to the tractor 1. The on-board electronic control unit 16 can make the tractor 1 automatically travel along the target traveling route P while acquiring the current position of itself (i.e., the current position of the tractor 1) by the positioning unit 19, on the basis of the acquired route data. The current position of the tractor 1 acquired by the positioning unit 19 is transmitted from the tractor 1 to the portable communication terminal 3 on a real-time basis (for example, at intervals of several seconds), and the current position of the tractor 1 is ascertained by the portable communication terminal 3.

As regards the transfer of the route data, the entire route data can be transferred at once from the terminal electronic control unit 30 to the on-board electronic control unit 16 at a stage before the tractor 1 starts the automatic traveling. Also, for example, the route data including the target traveling route P can be divided into a plurality of route parts each corresponding to a predetermined distance with a small amount of data. In this case, the transfer may be carried out in such a way that only an initial route part of the route data is transferred from the terminal electronic control unit 30 to the on-board electronic control unit 16 at a stage before the tractor 1 starts the automatic traveling. Further, after the automatic traveling has been started, each time the tractor 1 reaches a route acquisition point set according to the data amount, etc., route data of only the subsequent route part corresponding to that point may be transferred from the terminal electronic control unit 30 to the on-board electronic control unit 16.

In the case of starting the automatic traveling of the tractor 1, for example, when the user moves the tractor 1 to a start point, and various automatic traveling initiation conditions are satisfied, the user operates the liquid crystal panel 4 to instruct the automatic traveling to be started by way of the portable communication terminal 3. Thereby, the portable communication terminal 3 transmits an instruction to start the automatic traveling to the tractor 1. As a result, in the tractor 1, as the on-board electronic control unit 16 receives the instruction to start the automatic traveling, the on-board electronic control unit 16 starts automatic traveling control of making the tractor 1 automatically travel along the target traveling route P while acquiring the current position of its own (i.e., the current position of the tractor 1) by the positioning unit 19.

The automatic traveling control includes, for example, automatic gear shift control of automatically controlling the actuation of the transmission 11; automatic braking control of automatically controlling the actuation of the brake operation mechanism 13; automatic steering control of automatically steering the left and right front wheels 7; and working automatic control of automatically controlling the activation of the rotary cultivator device 6.

In the automatic gear shift control, the gear shift control portion 16*a* automatically controls the actuation of the transmission 11 so that a target vehicle speed set according to the traveling mode or the like of the tractor 1 on the target traveling route P can be obtained as the vehicle speed of the tractor 1, on the basis of the route data on the target traveling route P including the target vehicle speed, an output of the positioning unit 19, and an output of the vehicle speed sensor 17.

In the automatic braking control, the braking control portion 16*b* automatically controls the actuation of the brake operation mechanism 13 so that the left and right side brakes appropriately apply brakes on the left and right rear wheels 8 in a braking area included in the route data on the target traveling route P, on the basis of the target traveling route P and the output of the positioning unit 19.

In the automatic steering control, in order to allow the tractor 1 to automatically travel along the target traveling route P, the steering angle setting portion 16*e* obtains and sets the target steering angle of the left and right front wheels 7, on the basis of the route data on the target traveling route P and the output of the positioning unit 19, and outputs the set target steering angle to the power steering mechanism 12. The power steering mechanism 12 automatically steers the left and right front wheels 7 so that the target steering angle is obtained as the steering angle of the left and right front wheels 7, on the basis of the target steering angle and an output of the steering angle sensor 18.

Figure 5:
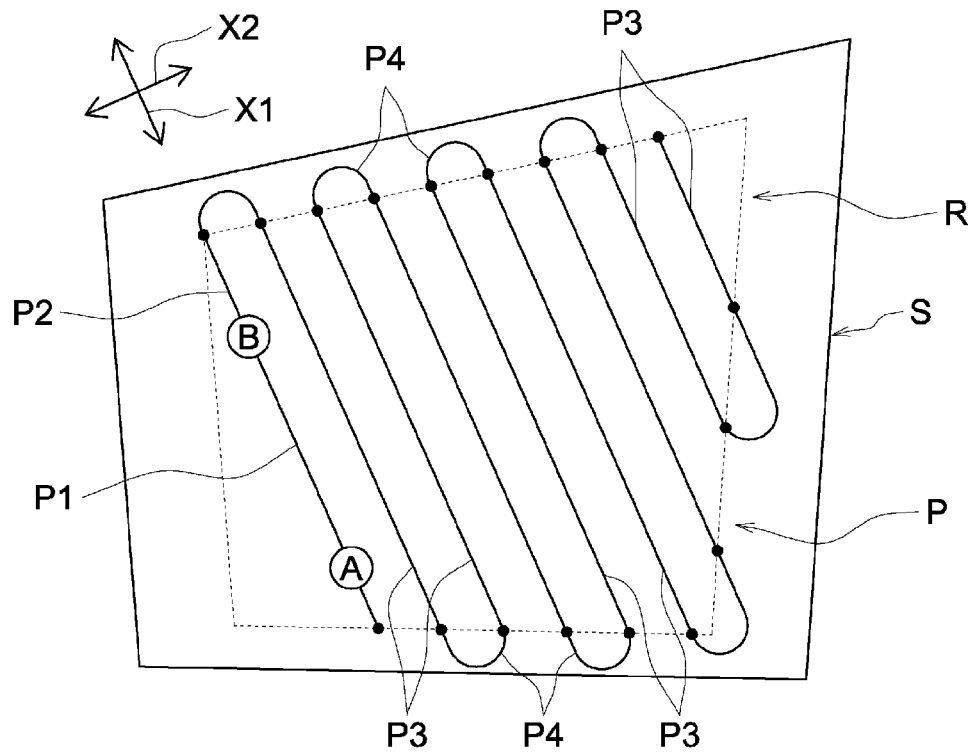
FIG. 5 is an illustration showing the traveling region in a state in which the target traveling route is set.

In the working automatic control, the working device control portion 16*c* automatically controls, on the basis of the route data on the target traveling route P and the output of the positioning unit 19, the actuation of the clutch operation mechanism 14 and the ascent/descent drive mechanism 15 so that cultivation by the rotary cultivator device 6 is started as the tractor 1 reaches a work start point such as a start edge of a work route P3 (for example, see FIG. 5), and the cultivation by the rotary cultivator device 6 is stopped as the tractor 1 reaches a work end point such as an end edge of the work route P3 (for example, see FIG. 5).

As described above, in the tractor 1, the automatic traveling unit 2 is configured from the transmission 11, the power steering mechanism 12, the brake operation mechanism 13, the clutch operation mechanism 14, the ascent/descent drive mechanism 15, the on-board electronic control unit 16, the vehicle speed sensor 17, the steering angle sensor 18, the positioning unit 19, the communication module 28, and the like.

In the present embodiment, not only is it possible to make the tractor 1 automatically travel without having the user or the like boarded in the cabin 9, but it is also possible to make the tractor 1 automatically travel with the user or the like boarded in the cabin 9. Accordingly, it possible to make the tractor 1 automatically travel along the target traveling route P while the user or the like is not boarded in the cabin 9 by virtue of the automatic traveling control by the on-board electronic control unit 16. Not only the above, but the automatic traveling control by the on-board electronic control unit 16 also enables the tractor 1 to automatically travel along the target traveling route P even if the user or the like is boarded in the cabin 9.

In a case where the user or the like is boarded in the cabin 9, switching can be made between an automatic traveling state whereby the tractor 1 is enabled to automatically travel by the on-board electronic control unit 16 and a manual traveling state whereby the tractor 1 is enabled to travel on the basis of the driving operation of the user or the like. Therefore, it is possible to switch from the automatic traveling state to the manual traveling state while the automatic traveling is being executed on the target traveling route P in the automatic traveling state. Conversely, switching can be made from the manual traveling state to the automatic traveling state while traveling is being executed in the manual traveling state. As regards the switching between the manual traveling state and the automatic traveling state, a switching operation portion for switching the state between the automatic traveling state and the manual traveling state can be provided near the seat 21, for example, and also, the switching operation portion can be displayed on the liquid crystal panel 4 of the portable communication terminal 3. Also, if the user operates the steering wheel 20 during the automatic traveling control by the on-board electronic control unit 16, switching can be made from the automatic traveling state to the manual traveling state.

Hereinafter, setting of the target traveling route P by the traveling route setting portion 32 will be explained.

When the traveling route setting portion 32 sets the target traveling route P, the car body data such as the type and model of the working vehicle or the working device is input by the user in accordance with the input guidance for target traveling route setting that is displayed on the liquid crystal panel 4 of the portable communication terminal 3. Further, the input car body data is stored in the terminal storage portion 33. The traveling region S in which the target traveling route P is to be set is assumed as a farm field, and the terminal electronic control unit 30 of the portable communication terminal 3 acquires the farm field data including the shape and positions of the farm field, and stores the acquired data in the terminal storage portion 33.

Acquisition of the farm field data is now explained. As the user or the like performs the driving operation and makes the tractor 1 actually travel, the terminal electronic control unit 30 can acquire position information for specifying the shape and positions of the farm field from the current position and the like of the tractor 1 acquired by the positioning unit 19. The terminal electronic control unit 30 specifies the shape and positions of the farm field from the acquired position information, and acquires the farm field data including the shape and positions of the farm field that have been specified.

Figure 3:
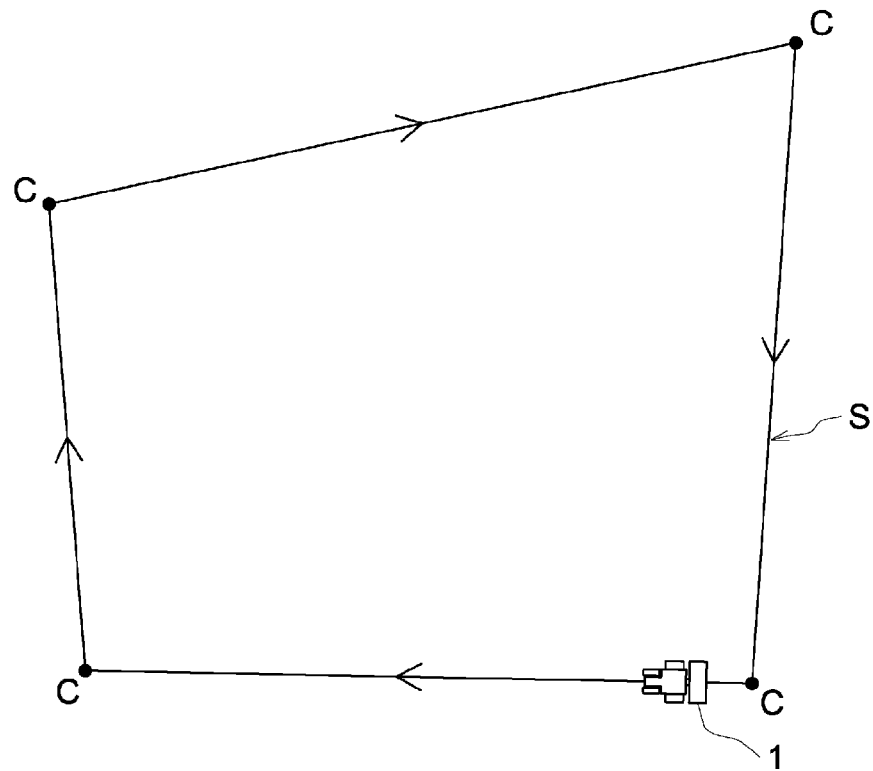
FIG. 3 is an illustration showing a traveling region in the process of setting a target traveling route.

As shown in FIG. 3, for example, the user or the like drives and operates the tractor 1 so that the tractor 1 travels around the outer peripheral part of the farm field, and positions the tractor 1 at points corresponding to the corners of the farm field. In this way, the terminal electronic control unit 30 sets the points corresponding to the corners of the farm field as specified points C; acquires the position information of each of the specified points C from the current position of the tractor 1 acquired by the positioning unit 19, and connects each of these specified points C by a straight line, thereby specifying the shape of the farm field; and sets the specified farm field as the traveling region S. As regards the positions of the farm field, for example, when the tractor 1 is positioned at a gateway or the like of the farm field, the terminal electronic control unit 30 specifies the positions of the farm field from the current position of the tractor 1 acquired by the positioning unit 19.

When the farm field data including the shape and positions of the farm field that have been specified is stored in the terminal storage portion 33, the traveling route setting portion 32 uses the farm field data and the car body data stored in the terminal storage portion 33 to set the target traveling route P. In order to set the target traveling route P, as shown in FIG. 2, the terminal electronic control unit 30 includes, for example, a work region setting portion 34 which sets a work region R for the tractor 1 to perform predetermined work (for example, the work such as cultivation) within the traveling region S; an initial route generation portion 32a which generates an initial route P1; a work route generation portion 32b which generates a plurality of work routes P3; a connection route generation portion 32c which generates a plurality of connection routes P4; and a traveling trajectory acquisition portion 37 which acquires a traveling trajectory to be formed when the tractor 1 is made to travel within the traveling region S. The initial route generation portion 32a, the work route generation portion 32b, and the connection route generation portion 32c are included in the traveling route setting portion 32.

Figure 9:
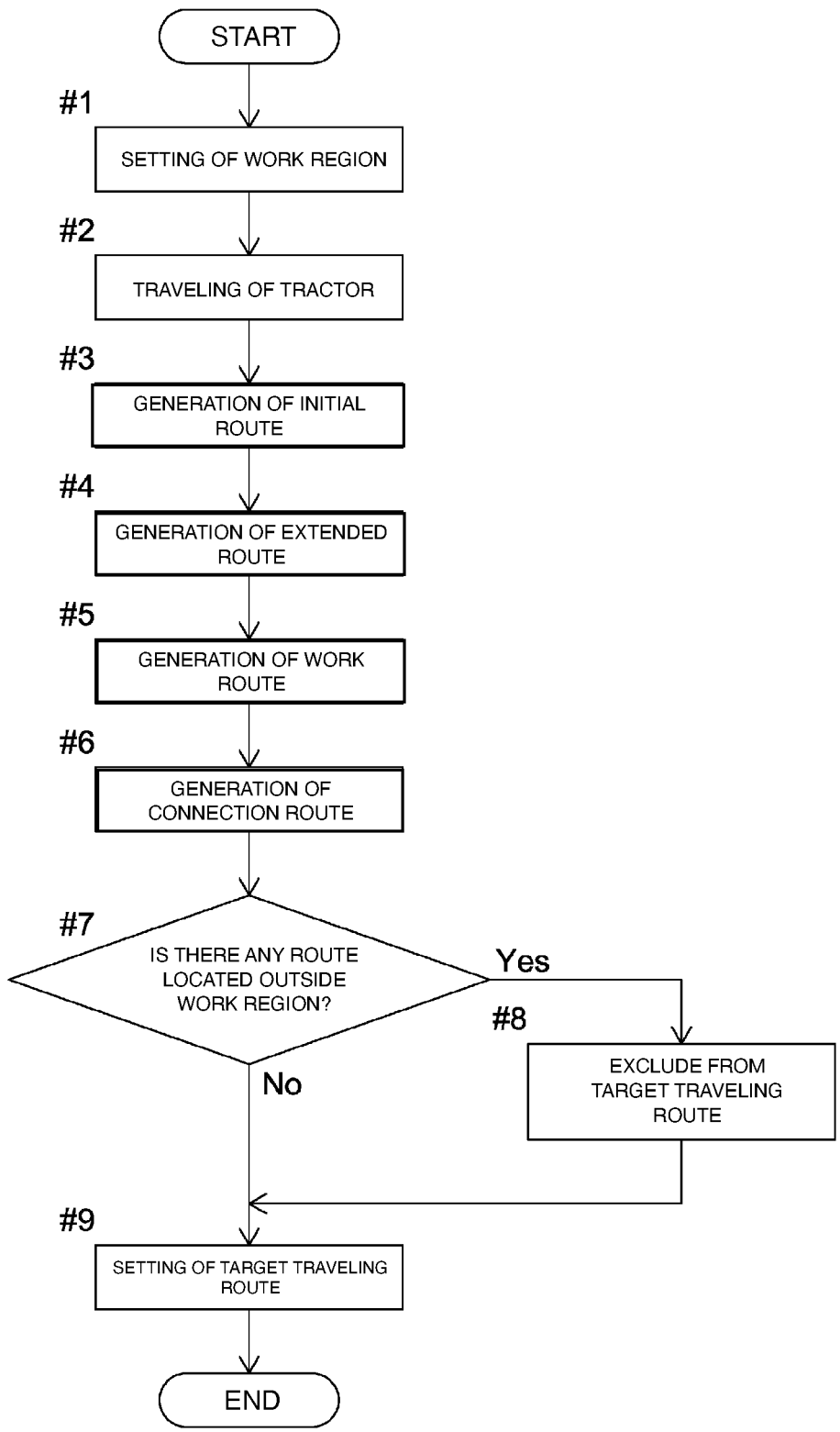
FIG. 9 is a flowchart concerning setting of the target traveling route.

Hereinafter, explanation is given with reference to FIG. 9 showing a flowchart concerning the setting of the target traveling route P.

Figure 4:
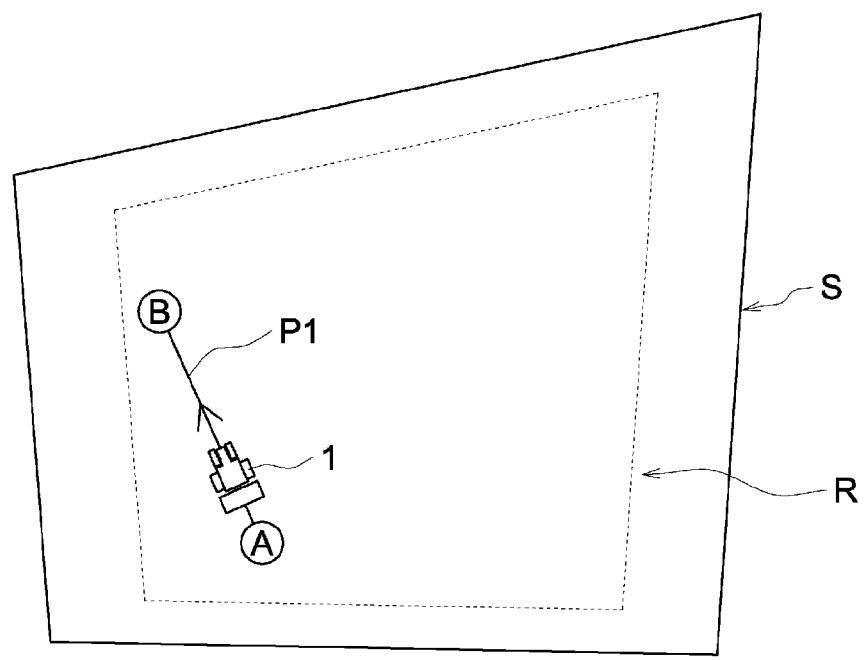
FIG. 4 is an illustration showing the traveling region in the process of setting the target traveling route.

After the farm field data and the car body data, etc., have been acquired, first, the work region setting portion 34 sets the work region R (step #1 in FIG. 9). The work region R (the region indicated by a dotted line in FIGS. 4 and 5) set by the work region setting portion 34 is a region in which predetermined work (for example, the work such as cultivation) is performed while the tractor 1 is made to automatically travel. The work region setting portion 34 obtains, for example, a space for turn and travel which is required for the tractor 1 to turn and travel, and a safety space which should be secured to avoid troubles such as the trouble of having the tractor 1 protruding from the traveling region S, on the basis of a turning radius included in the car body data, and a front-rear width and a left-right width of the tractor 1. As shown in FIG. 4, the work region setting portion 34 sets the work region R inside the traveling region S with the obtained spaces being secured at the inner side of the outer peripheral part of the traveling region S.

After the work region R has been set by the work region setting portion 34, as the user or the like performs the driving operation and makes the tractor 1 actually travel within the traveling region S, the initial route generation portion 32a generates the initial route P1, as shown in FIG. 4 (step #2 and step #3 in FIG. 9). When the user or the like makes the tractor 1 travel from point A to point B, the traveling trajectory acquisition portion 37 acquires the traveling trajectory from point A to point B on the basis of the output of the positioning unit 19. Thus, the initial route generation portion 32a generates a route corresponding to the traveling trajectory of the above as the initial route P1. A traveling direction of the initial route P1 is set to be the same as the direction of traveling when the user or the like makes the tractor 1 travel, and the direction from point A to point B is assumed as the traveling direction. The drawing of FIG. 4 exemplifies a case where a linear traveling trajectory is acquired as the traveling trajectory from point A to point B.

Here, when the traveling trajectory acquisition portion 37 acquires the traveling trajectory, the traveling trajectory acquisition portion 37 can set a start edge of the traveling trajectory at point A, and set an end edge of the traveling trajectory at point B, for example. In this case, as the traveling trajectory acquisition portion 37 connects the position information, which is acquired from the output of the positioning unit 19 when the tractor 1 is located at point A, and the position information, which is acquired from the output of the positioning unit 19 when the tractor 1 is located at point B, a linear traveling trajectory from point A to point B can be acquired. Alternatively, respective traveling positions during traveling of the tractor 1 from point A to point B may be continuously acquired from the outputs of the positioning unit 19, whereby the traveling trajectory of the actual traveling of the tractor 1 can be acquired from the continuous traveling positions. Therefore, by the user operation on the liquid crystal panel 4, etc., a mode of acquiring the traveling trajectory by setting the start edge and the end edge of the traveling trajectory, and a mode of acquiring the traveling trajectory by continuously acquiring the respective traveling positions can be switched.

When the initial route generation portion 32a generates the initial route P1, the work route generation portion 32b extends the initial route P1 within the work region R to generate an extended route P2, as shown in FIG. 5 (step #4 in FIG. 9). Thereby, the extended route P2 includes the initial route P1. When the extended route P2 is generated, the work route generation portion 32b generates a plurality of work routes P3 arranged in a state of being parallel to the extended route P2 in a parallel arrangement direction X2, which is orthogonal to an extension direction X1 of the extended route P2 (i.e., the direction in which the extended route P2 extends) (step #5 in FIG. 9). The work route generation portion 32b assumes the direction which is orthogonal to the extension direction X1 of the extended route P2 as the parallel arrangement direction X2, and first generates the work route P3 parallel to the extended route P2 at a position away from the extended route P2 by a distance corresponding to a work width or the like, which is included in the car body data, in the parallel arrangement direction X2. Next, the work route generation portion 32b generates another work route P3 parallel to the generated work route P3 at a position away from the generated work route P3 by a distance corresponding to the work width or the like, which is included in the car body data, in the parallel arrangement direction X2. In this way, the work route generation portion 32b repeatedly performs the operation of generating the work route P3 parallel to the already-generated work route P3. By doing so, the work route generation portion 32b generates the plurality of work routes P3 in such a way that a distance between the extended route P2 and the work route P3 and a distance between the respective work routes P3, the routes being adjacent to each other in the parallel arrangement direction X2, are kept at a constant distance, and that the routes are arranged in a state of being parallel to each other over the entire work region R.

When the work route generation portion 32b generates the plurality of work routes P3, as shown in FIG. 5, the connection route generation portion 32c generates the plurality of connection routes P4 each connecting, at one end side or the other end side of the work region R, routes adjacent to each other in the parallel arrangement direction X2 among the extended route P2 and the plurality of work routes P3 (step #6 in FIG. 9). The connection route generation portion 32c generates, at an outer side of the work region R within the traveling region S, the connection route P4 connecting the end edge of the extended route P2 or the work route P3 to the start edge of the next work route P3 in which the edges are adjacent to each other in the parallel arrangement direction X2.

When the extended route P2 including the initial route P1, the plurality of work routes P3, and the plurality of connection routes P4 are generated, unless there exists a route located outside the work region R among the initial route P1, the extended route P2, and the plurality of work routes P3, the traveling route setting portion 32 sets the target traveling route P including the extended route P2 including the initial route P1, the plurality of work routes P3, and the plurality of connection routes P4 (step #9 corresponding to the case of No in step #7, in FIG. 9). The extended route P2 and the plurality of work routes P3 are the routes for performing predetermined work while making the tractor 1 automatically travel, and the drawing of FIG. 5 exemplifies a linear route along which the tractor 1 is made to move forward. The connection route P4 is a route for changing the traveling direction of the tractor 1, and connects the end edge of the extended route P2 or the work route P3 to the start edge of the next work route P3. The drawing of FIG. 5 exemplifies a U-turn route whereby the tractor 1 is enabled to turn and travel in order to change the traveling direction of the tractor 1 by 180 degrees with the connection route P4. As described above, the extended route P2 and the work route P3, and the work routes P3 that are adjacent to each other in the parallel arrangement direction X2 are generated such that the traveling directions are opposite to each other. The target traveling route P along which the tractor 1 performs the predetermined work while reciprocatingly traveling along the extended route P2 and the plurality of work routes P3 is set.

The drawing of FIG. 5 exemplifies a case where the initial route P1 and the extended route P2 are formed as linear routes. However, as the shapes of the initial route P1 and the extended route P2, various shapes such as an arc shape, and a shape which is curved from a linear route intermediate portion, for example, are applicable. In other words, the shapes of the initial route P1 and the extended route P2 become those corresponding to the traveling trajectory formed when the user or the like makes the tractor 1 travel. The work route generation portion 32b generates the work route P3 corresponding to the shapes of the initial route P1 and the extended route P2. Thus, not only the initial route P1 and the extended route P2, but also the work route P3 has the shape corresponding to the traveling trajectory formed when the user or the like makes the tractor 1 travel. Accordingly, the target traveling route P shown in FIG. 5 is merely an example, and the shape of the target traveling route P is changed depending on how the user or the like makes the tractor 1 travel.

As described above, as the user or the like makes the tractor 1 travel, the target traveling route P corresponding to the position and angle of the traveling trajectory of the tractor 1 at that time can be set. Therefore, as the user or the like merely causes the tractor 1 to travel over a place where the predetermined work needs to be performed within the traveling region S, the target traveling route P according to the request of the user or the like can be set.

Figure 6:
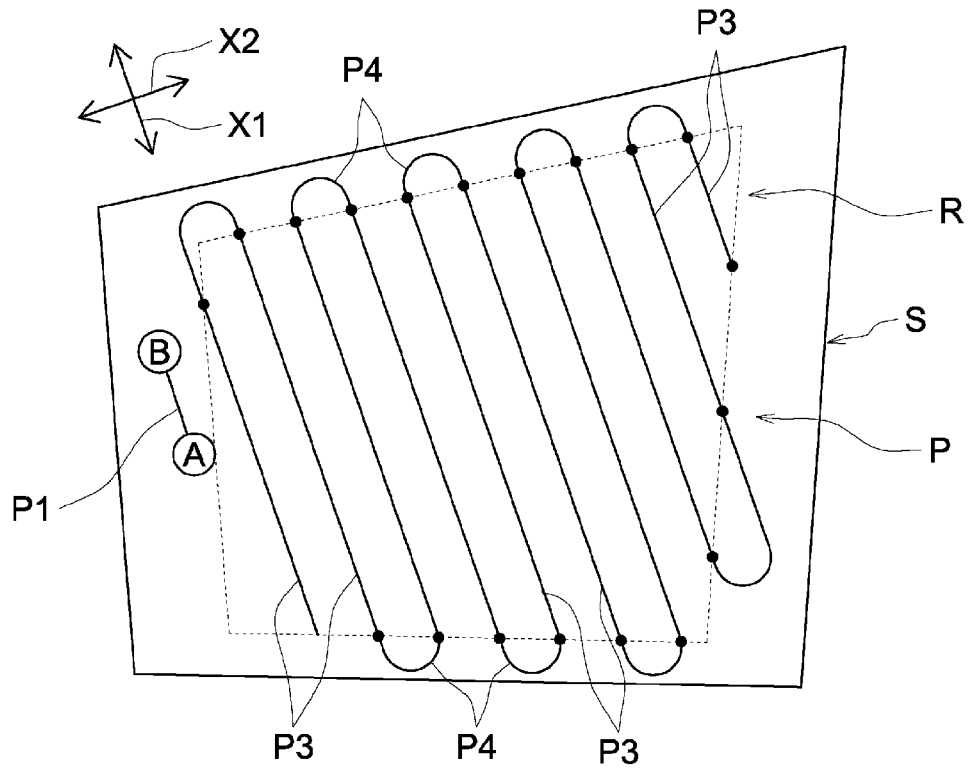
FIG. 6 is an illustration showing the traveling region in a state in which the target traveling route is set.

In making the tractor 1 travel, the user or the like can freely determine where the tractor 1 should be made to travel within the traveling region S. Therefore, for example, as shown in FIG. 6, the initial route P1, which is based on the traveling trajectory to be formed when the tractor 1 is made to travel, may be located outside the work region R (i.e., the area shown by a dotted line in FIG. 6). In such a case, if the initial route P1 is included in the target traveling route P, the tractor 1 is to perform the predetermined work outside the work region R, which is not desirable. Hence, as shown in FIG. 2, the terminal electronic control unit 30 includes a route exclusion portion 35 which excludes a route located outside the work region R, among the initial route P1, the extended route P2, and the plurality of work routes P3, from the target traveling route P.

The route exclusion portion 35 excludes a route, if there is any route located outside the work region R among the extended route P2 and the plurality of work routes P3, from the target traveling route P, and the traveling route setting portion 32 sets the target traveling route P in a state where the route located outside the work region R, among the extended route P2 and the plurality of work routes P3, is excluded (step #8 and step #9 corresponding to the case of Yes in step #7, in FIG. 9).

The route exclusion portion 35 excludes the routes (the initial route P1, the extended route P2, and the work routes P3) that are located outside the work region R from the target traveling route P. Therefore, the routes located outside the work region R are not included in the target traveling route P, and only the routes that are located within the work region R are to be included in the target traveling route P. Consequently, the area where the tractor 1 performs the predetermined work is limited to be within the work region R, and it is possible to prevent the tractor 1 from performing the predetermined work outside the work region R.

Explanation is added for an example in which the route is excluded from the target traveling route P by the route exclusion portion 35.

FIG. 6 exemplifies a case where the initial route P1 is located outside the work region R. In this case, the route exclusion portion 35 excludes the initial route P1 from the target traveling route P. Thus, in the example shown in FIG. 6, the traveling route setting portion 32 sets the target traveling route P by excluding the initial route P1 and including the plurality of work routes P3 and the plurality of connection routes P4.

Figure 7:
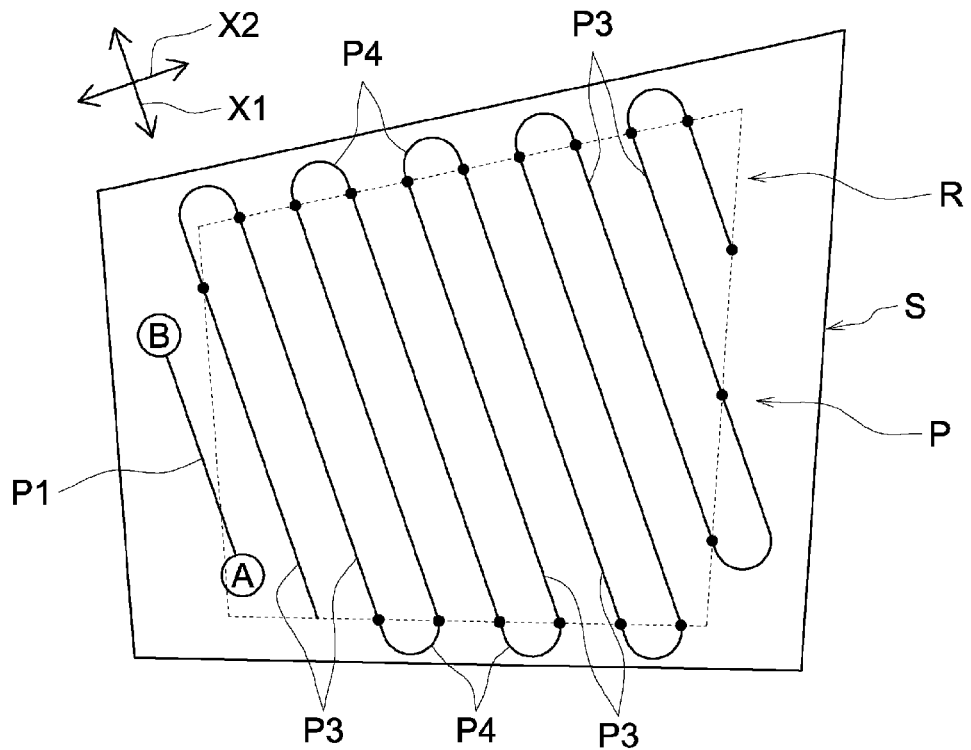
FIG. 7 is an illustration showing the traveling region in a state in which the target traveling route is set.

Also, FIG. 7 exemplifies a case where only a part of the initial route P1 is located outside the work region R. In this case, when the length of the part of the initial route P1 located within the work region R is less than or equal to a predetermined length, the route exclusion portion 35 excludes the initial route P1 from the target traveling route P. In this way, when there is a route which is partially located outside the work region R, if the length of a part of the route located within the work region R is less than or equal to the predetermined length, the route exclusion portion 35 excludes the route from the target traveling route P. Accordingly, in the example shown in FIG. 7, the traveling route setting portion 32 sets the target traveling route P by excluding the initial route P1 and including the plurality of work routes P3 and the plurality of connection routes P4. Here, the predetermined length can be set to, for example, a length greater than or equal to a distance obtained by adding a distance necessary for starting the work of cultivation, etc., by lowering the rotary cultivator device 6, and a distance necessary for finishing the work of cultivation, etc., by raising the rotary cultivator device 6. The distance corresponds to the minimum distance required for the tractor 1 to perform the predetermined work effectively.

In the example shown in FIG. 5, not only are the work routes P3 generated by the work route generation portion 32b, but the connection routes P4 are also generated by the connection route generation portion 32c. However, as shown in FIG. 8, for example, the traveling route setting portion 32 can also set the target traveling route P without generating the connection routes P4 by the connection route generation portion 32c.

Figure 8:
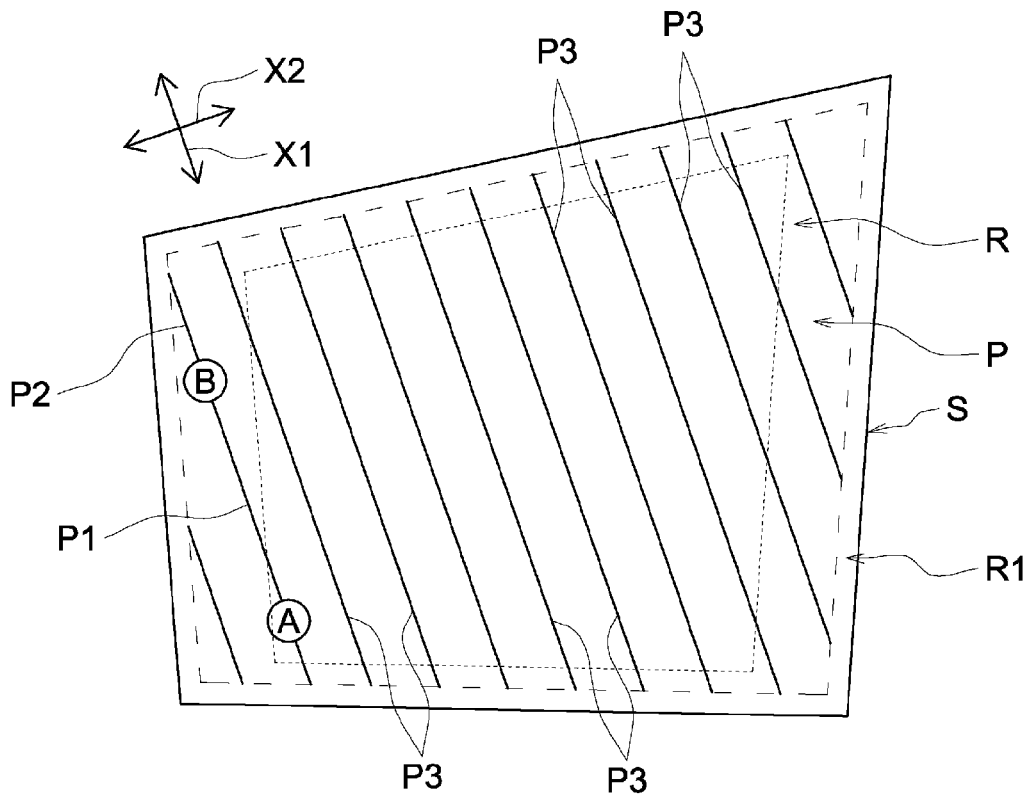
FIG. 8 is an illustration showing the traveling region in a state in which the target traveling route is set.

In the example shown in FIG. 8, since the connection routes P4 are not generated, a space for turn and travel is unnecessary. Thus, the work region setting portion 34 sets a work region R1 extending more outwardly than the work region R in which the space for turn and travel is considered. As a result, the initial route generation portion 32a generates the extended route P2 within the work region R1, and the work route generation portion 32b also generates a plurality of work routes P3 within the work region R1. Accordingly, the traveling route setting portion 32 sets the target traveling route P including the extended route P2 and the plurality of work routes P3.

As shown in FIG. 8, when the target traveling route P is set, the tractor 1 can be made to automatically travel with the user or the like boarded in the cabin 9, for example, to perform the predetermined work. As described above, the automatic traveling state whereby the tractor 1 is enabled to automatically travel by the on-board electronic control unit 16 and the manual traveling state whereby the tractor 1 is enabled to travel on the basis of the driving operation of the user or the like can be switched. Therefore, in the middle of performing the automatic traveling of the tractor 1 along the extended route P2 and the work route P3 as a result of the state being switched to the automatic traveling state, if the state is switched from the automatic traveling state to the manual traveling state, traveling of the tractor 1 can be performed on the basis of the driving operation of the user or the like. Therefore, when the tractor 1 reaches the vicinity of an end portion of the traveling region S, the tractor 1 can be made to turn and travel by the driving operation of the user or the like by switching the state from the automatic traveling state to the manual traveling state. By causing the tractor 1 to turn and travel, the tractor 1 comes close to the next work route P3. Thus, by switching the state from the manual traveling state to the automatic traveling state, the tractor 1 can be made to automatically travel along the next work route P3. As can be seen, the tractor 1 can be made to automatically travel along the target traveling route P while performing the turn and travel by the driving operation of the user or the like by switching of the state to the manual traveling state.

Whether or not the connection route P4 is to be generated as the target traveling route P can be selected by the user or the like. As the user or the like operates the liquid crystal panel 4, etc., it is possible to switch the state between a state in which the connection routes P4 are generated, as shown in FIG. 5, and a state in which the connection routes P4 are not generated, as shown in FIG. 8.

As described above, while the target traveling route P is set by the traveling route setting portion 32, due to change of a work condition or the other conditions, for example, there may be a case where the user or the like wishes to change the target traveling route P set by the traveling route setting portion 32. Therefore, in the automatic traveling system of the present embodiment, the target traveling route P set by the traveling route setting portion 32 can be changed according to the request of the user or the like.

Figure 10:
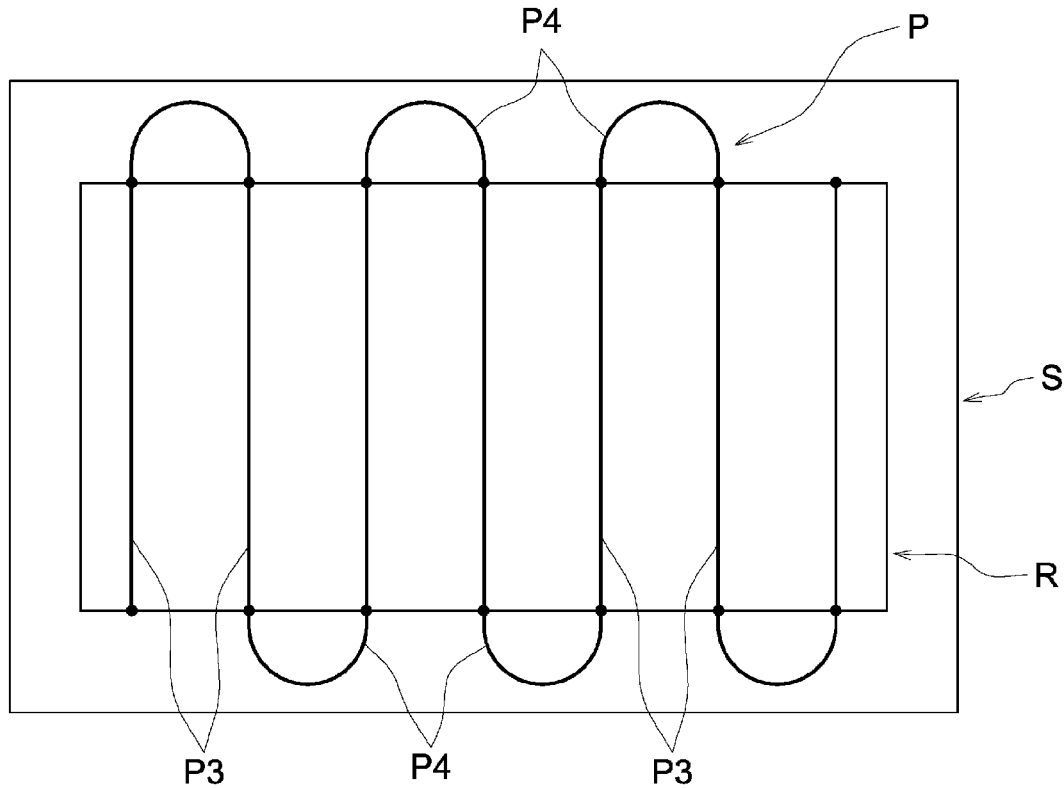
FIG. 10 is an illustration showing the traveling region in a state in which the target traveling route is set.

Hereinafter, an explanation is given for a case where the target traveling route P is changed in a state in which the traveling route setting portion 32 has set the target traveling route P shown in FIG. 10. Incidentally, in the drawing of FIG. 10, a rectangular work region R is set relative to a rectangular traveling region S, and the target traveling route P is set with a plurality of work routes P3 and a plurality of connection routes P4 being included. Further, since the extended route P2 described above is a route similar to the work routes P3, it is assumed that the extended route P2 is set as the work route P3.

As shown in FIG. 2, the terminal electronic control unit 30 includes a reference route selection portion 36 capable of selecting a part of the plurality of work routes P3 as a reference route P5; the traveling trajectory acquisition portion 37 which acquires a traveling trajectory F to be formed when the tractor 1 is made to travel within the traveling region S; a traveling route changing portion 38 which changes the target traveling route P so that the reference route P5 conforms to the traveling trajectory F; a travel stop position acquisition portion 39 which acquires a stopped position of the tractor 1 within the traveling region S; and a traveling route adjusting portion 40 which adjusts a target traveling route T after change, which is the target traveling route subjected to change by the traveling route changing portion 38.

Hereinafter, explanation is given with reference to FIG. 18 showing a flowchart concerning the change of the target traveling route P.

Also in the case of changing the target traveling route P which has been set by the traveling route setting portion 32, similarly to the case of setting the target traveling route P by the traveling route setting portion 32, the target traveling route P set by the traveling route setting portion 32 is changed as the user or the like performs the driving operation and makes the tractor 1 actually travel within the traveling region S (step #11 in FIG. 18).

Figure 11:
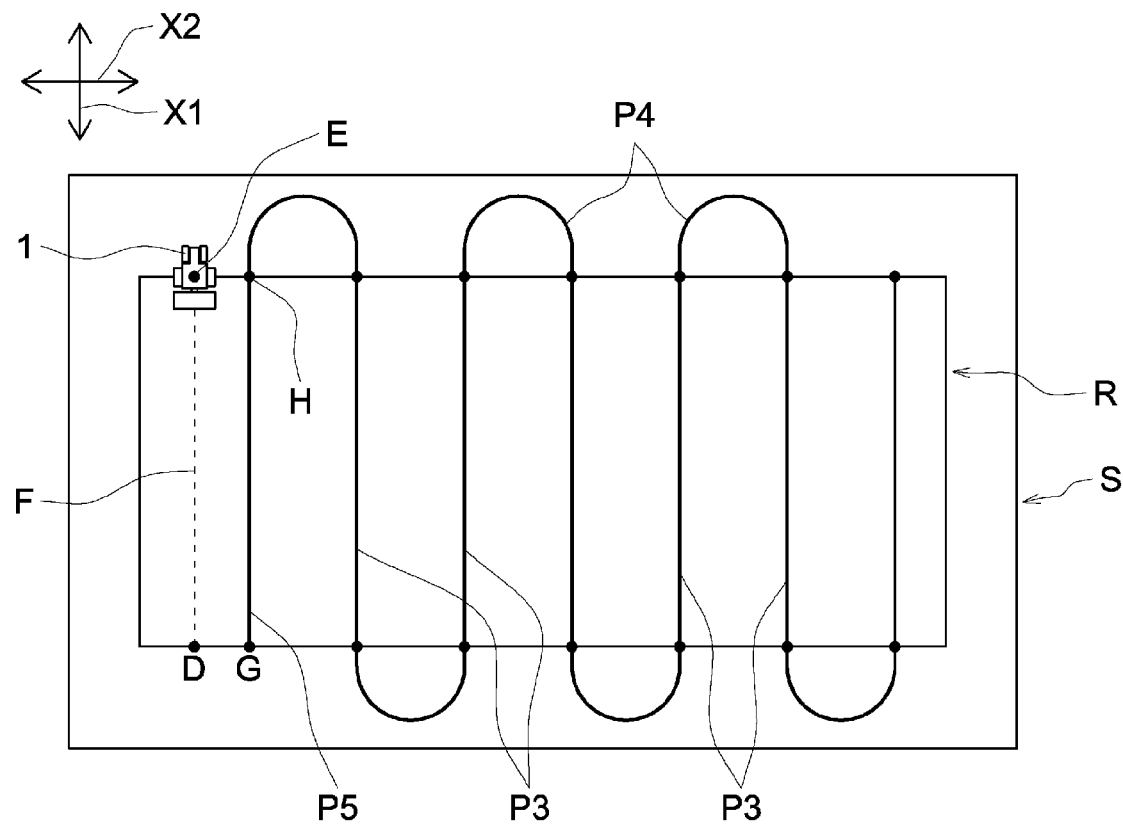
FIG. 11 is an illustration showing the traveling region in the process of changing the target traveling route.
Figure 12:
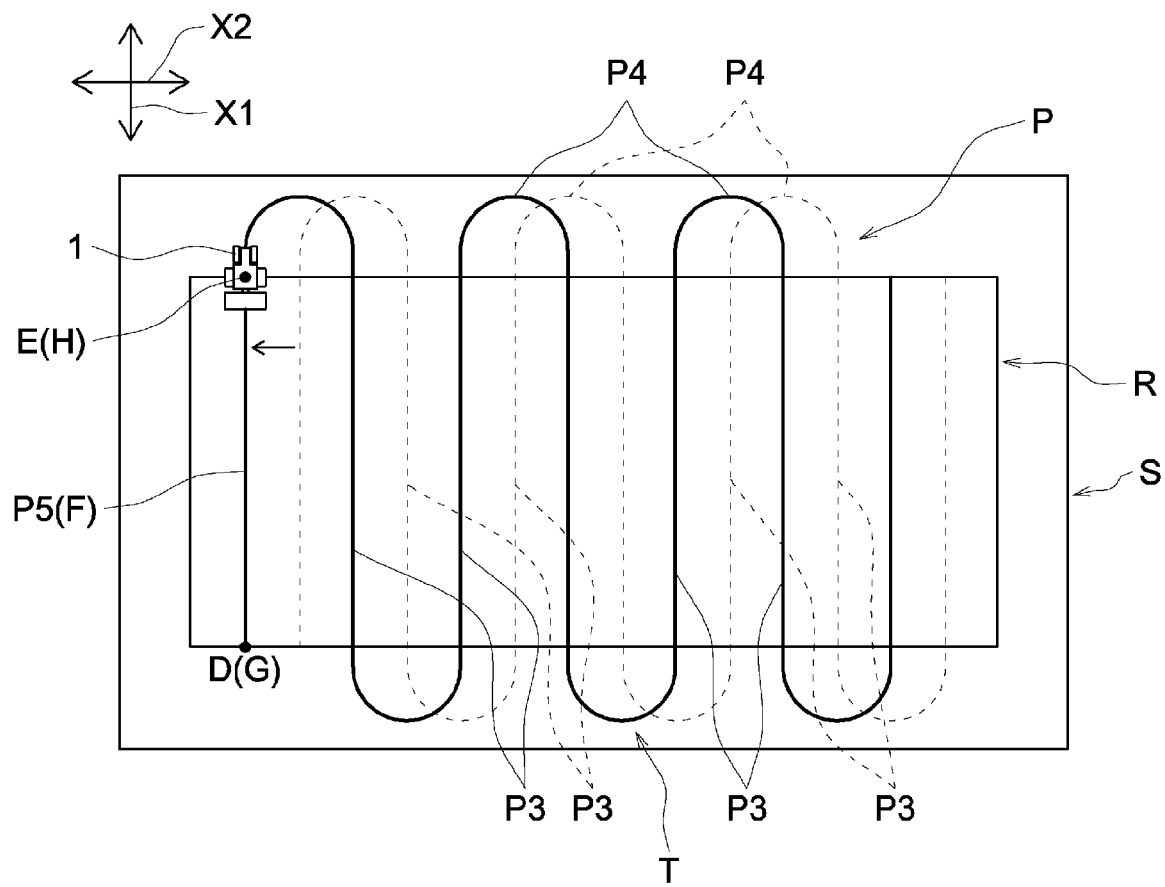
FIG. 12 is an illustration showing the traveling region in a state in which the target traveling route is changed.

As shown in FIG. 11, when the user or the like makes the tractor 1 travel from point D to point E, the traveling trajectory acquisition portion 37 acquires the traveling trajectory F (indicated by a dotted line in FIG. 11) from point D to point E. At this time, the target traveling route P is displayed on the liquid crystal panel 4 of the portable communication terminal 3, and the user or the like can select one work route P3 from among the plurality of work routes P3 included in the target traveling route P. When one work route P3 is selected by the user or the like, the reference route selection portion 36 selects the selected work route P3 as the reference route P5 (step #12 in FIG. 18). Incidentally, the reference route P5 is displayed in a predetermined color (for example, red) different from the color of the other work routes P3 so as to be distinguishable from the other work routes P3. In the drawings of FIGS. 11 and 12, the states in which the reference route selection portion 36 selects the leftmost work route P3 as the reference route P5 are exemplified.

As the traveling trajectory acquisition portion 37 acquires the traveling trajectory F from point D to point E by making the tractor 1 travel by the driving operation of the user or the like, and the reference route P5 is selected by the reference route selection portion 36, the traveling route changing portion 38 moves the target traveling route P so that the reference route P5 conforms to the traveling trajectory F, thereby changing the target traveling route P (step #13 in FIG. 18). Incidentally, in FIG. 18, regarding the order of traveling of the tractor 1 and selection of the reference route P, the reference route P can alternatively be selected first, and the tractor 1 can be made to travel thereafter.

When the tractor 1 is made to travel, determining the traveling distance of the tractor 1 is left to the discretion of the user or the like. Therefore, while the traveling distance is changed as appropriate, the traveling distance of the tractor 1 and the length of the reference route P5 may become the same. Hence, FIG. 11 shows a case where the length of the traveling trajectory F acquired by the traveling trajectory acquisition portion 37 and the length of the reference route P5 become the same, as an instance. In this case, as shown in FIG. 12, the traveling route changing portion 38 moves the target traveling route P (indicated by a dotted line in FIG. 12) in parallel such that the reference route P5 conforms to the traveling trajectory F while maintaining the lengths of the reference route P5 and the plurality of work routes P3, thereby acquiring the target traveling route T after change (indicated by a solid line in FIG. 12). In this way, the traveling route changing portion 38 sets the target traveling route T after change (shown by the solid line in FIG. 12) instead of the target traveling route P before change.

Also, how the target traveling route P is to be changed by the traveling route changing portion 38, when the length of the traveling trajectory F acquired by the traveling trajectory acquisition portion 37 and the length of the reference route P5 are different from each other, will be described later by referring to FIGS. 13 and 14.

In the drawings of FIGS. 11 and 12, the position of the traveling trajectory F and the position of the reference route P5 are the same position in the extension direction X1 of the work route P3, and are different in the parallel arrangement direction X2 of the work routes P3. Accordingly, it is necessary for the traveling route changing portion 38 to merely move the target traveling route P (indicated by the dotted line in FIG. 12) in parallel in the parallel arrangement direction X2 of the work routes P3 such that the reference route P5 conforms to the traveling trajectory F while maintaining the lengths of the reference route P5 and the plurality of work routes P3, and the target traveling route T after change (indicated by the solid line in FIG. 12) can be acquired.

Though not illustrated in the drawings, the position of the traveling trajectory F and the position of the reference route P5 may be different not only in the parallel arrangement direction X2 of the work routes P3, but also in the extension direction X1 of the work route P3. In this case, as the traveling route changing portion 38 moves the target traveling route P in parallel not only in the parallel arrangement direction X2 of the work routes P3, but also in the extension direction X1 of the reference route P5, it is possible to acquire the target traveling route T after change in which the reference route P5 conforms to the traveling trajectory F.

Also, there may be a discrepancy between the traveling direction in the traveling trajectory F and the traveling direction in the reference route P5. In this case, the traveling route changing portion 38 rotationally moves, for example, the reference route P5 and the plurality of work routes P3 about the start edge or the end edge, and then moves the target traveling route P in parallel such that the traveling direction in the reference route P5 agrees with the traveling direction in the traveling trajectory F. By doing so, the target traveling route T after change in which the reference route P5 conforms to the traveling trajectory F can be acquired.

In this way, as the user or the like makes the tractor 1 travel, the target traveling route can be changed to the target traveling route T corresponding to the position and angle of the traveling trajectory of the tractor 1 at that time. Therefore, as the user or the like employs the tractor 1 to merely travel over a place where the predetermined work needs to be performed within the traveling region S, the target traveling route can be changed to the target traveling route T according to the request of the user or the like.

In a case where the user or the like makes the tractor 1 travel, if the traveling position is within a predetermined distance from the outer peripheral part of the traveling region S, there is a possibility that a safety space may not be secured. Therefore, the fact that the traveling position of the tractor 1 is within a predetermined distance from the outer peripheral part of the traveling region S is displayed on the liquid crystal panel 4, etc., for notification to the user or the like.

Various methods are applicable as the way for changing the target traveling route P by the traveling route changing portion 38. Thus, in the following, the method will be described with reference to FIGS. 13 to 16. In FIGS. 13 to 16, in order to depict how the target traveling route is changed, the target traveling route P before change and the target traveling route T after change are mainly illustrated. The target traveling route P, which has not yet been subjected to change by the traveling route changing portion 38, is shown on the left, and the target traveling route T, which has been subjected to change by the traveling route changing portion 38, is shown on the right. Also, in FIGS. 13 to 16, the traveling trajectory F is indicated by a thick dotted line, and the target traveling route P before change and the target traveling route T after change are indicated by thin dotted lines.

Figure 13:
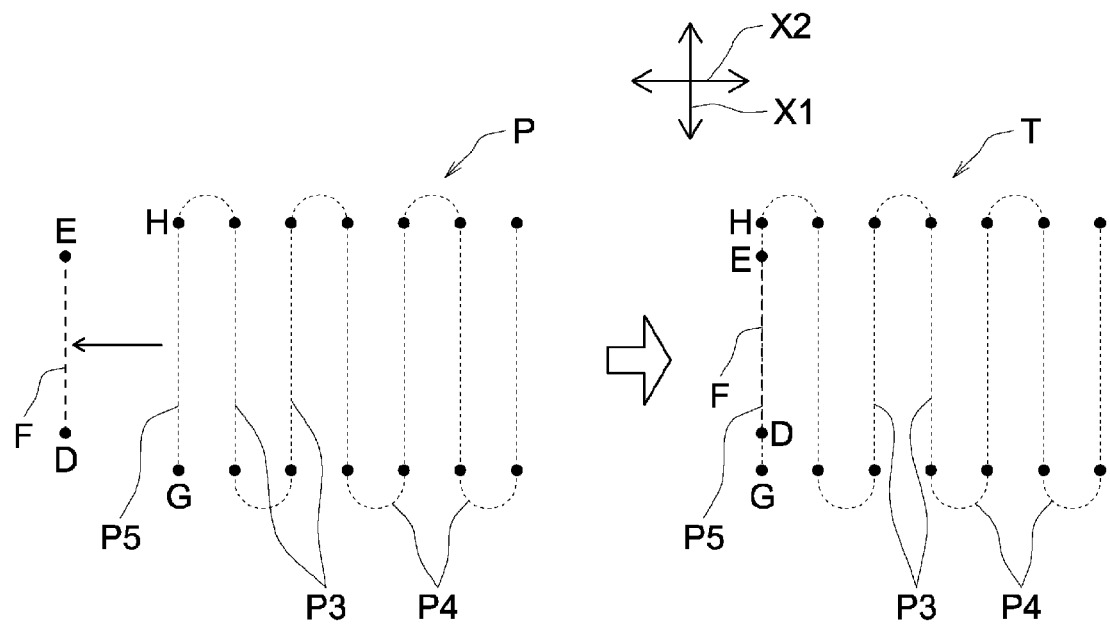
FIG. 13 is a schematic view showing the way to change the target traveling route.
Figure 14:
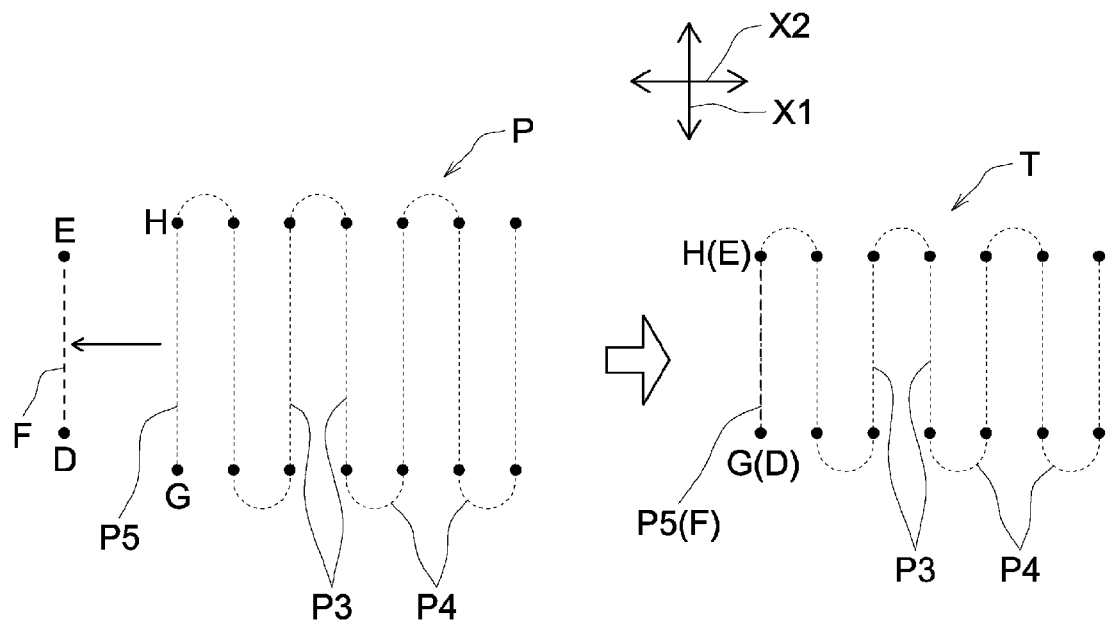
FIG. 14 is a schematic view showing the way to change the target traveling route.

For example, if the traveling distance is short when the user or the like makes the tractor 1 travel, as shown in FIG. 13, the length of the traveling trajectory F acquired by the traveling trajectory acquisition portion 37 may become shorter than the length of the reference route P5. Also in this case, as in the case where the length of the traveling trajectory F acquired by the traveling trajectory acquisition portion 37 is equal to the length of the reference route P5, the traveling route changing portion 38 moves the target traveling route P in parallel such that the reference route P5 conforms to the traveling trajectory F while maintaining the lengths of the reference route P5 and the plurality of work routes P3. By this change, the traveling route changing portion 38 can acquire the target traveling route T after change in which the reference route P5 conforms to the traveling trajectory F. Accordingly, when the user or the like makes the tractor 1 travel, it is not necessary to make the tractor 1 travel by the same distance as the reference route P5, and the work of changing the target traveling route T can be simplified.

The user or the like may wish to make the length of the route for performing the predetermined work shorter than the reference route P5 or the work route P3. In such a case, by reducing the traveling distance by which the user or the like makes the tractor 1 travel, as shown in FIG. 14, the length of the traveling trajectory F acquired by the traveling trajectory acquisition portion 37 becomes shorter than the length of the reference route P5. Here, the traveling route changing portion 38 can move the target traveling route P in parallel by reducing the lengths of the reference route P5 and the plurality of work routes P3 so that start and end edges G and H of the reference route P5 match with start and end edges D and E of the traveling trajectory F. By this change, the traveling route changing portion 38 can acquire the target traveling route T after change in which the reference route P5 and the work routes P3 are shortened in accordance with the length of the traveling trajectory F. The target traveling route can thereby be changed to the target traveling route T including the work routes P3 each having the length according to the request of the user or the like.

Figure 15:
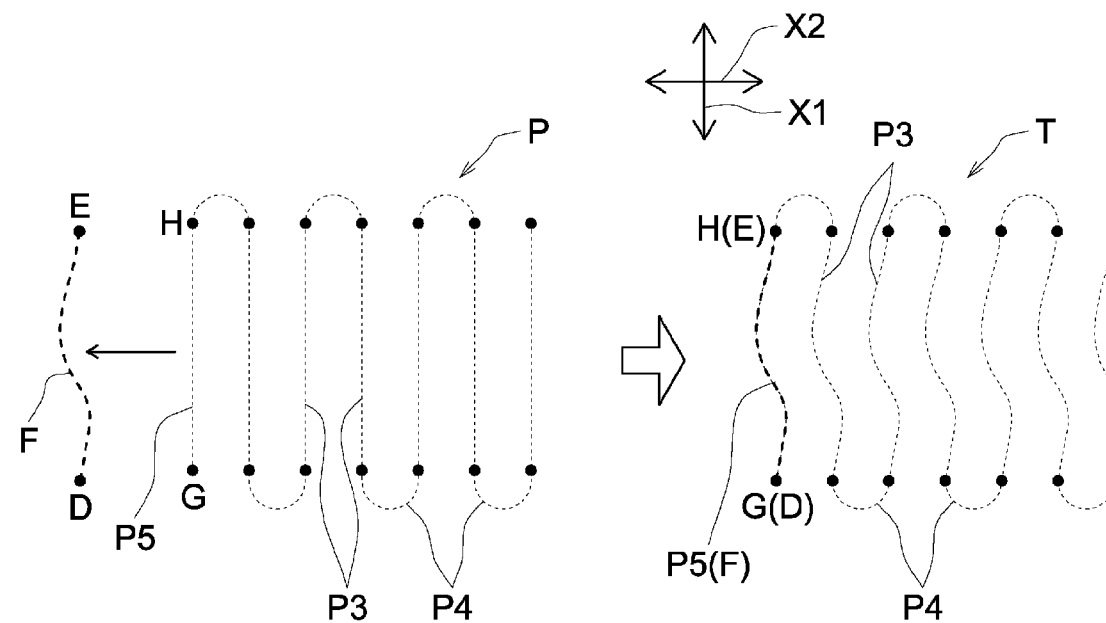
FIG. 15 is a schematic view showing the way to change the target traveling route.

The drawings of FIGS. 11 and 12 illustrate a case where the target traveling route is changed to the target traveling route T including linear work routes P3. However, as shown in FIG. 15, the user or the like may wish to change the target traveling route to the target traveling route T including the work routes P3 which are not linear. In this case, as the user or the like runs the tractor 1 along the route having a shape for performing the predetermined work, the shape of the traveling trajectory F acquired by the traveling trajectory acquisition portion 37 and the shape of the reference route P5 are varied. Here, the traveling route changing portion 38 moves the target traveling route P such that the reference route P5 conforms to the traveling trajectory F in a state of performing shape alteration to conform the shape of the reference route P5 and the shapes of the plurality of work routes P3 to the shape of the traveling trajectory F. The traveling route changing portion 38 can acquire the target traveling route T after change in which the shapes of the reference route P5 and the work routes P3 are changed in accordance with the shape of the traveling trajectory F. The target traveling route can thereby be changed to the target traveling route T including the work routes P3 each having a shape according to the request of the user or the like. Incidentally, when the traveling trajectory acquisition portion 37 acquires the traveling trajectory F shown in FIG. 15, the traveling trajectory acquisition portion 37 continuously acquires respective traveling positions during traveling of the tractor 1 from point D to point E from the outputs of the positioning unit 19, thereby acquiring the traveling trajectory F of the actual traveling of the tractor 1 from the continuous traveling positions.

The drawing of FIG. 15 exemplifies a case in which the user or the like causes the tractor 1 to meander by having the tractor 1 travel diagonally forward to the right, then travel diagonally forward to the left, and travel diagonally forward to the right again. For example, the user or the like can also make the tractor 1 travel in a curve which is curved obliquely forward to the right or forward to the left, and the user or the like can freely choose how the tractor 1 should be made to travel. As described above, even if the shape of the route along which the user or the like wishes to perform the predetermined work is different from the shape of the reference route P5, by making the tractor 1 travel in accordance with the shape of the route along which the predetermined work is to be performed, the target traveling route can be changed to the target traveling route T in accordance with the shape of the traveling trajectory F at that time.

Figure 16:
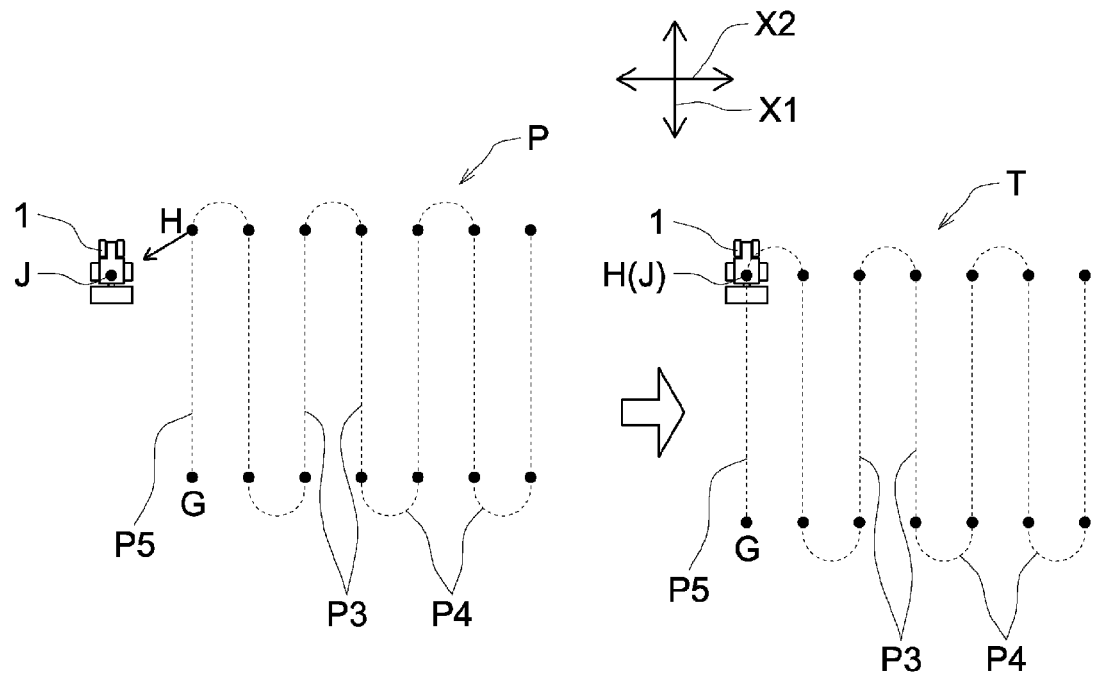
FIG. 16 is a schematic view showing the way to change the target traveling route.

In the cases shown in FIGS. 11 and 12, the traveling route changing portion 38 changes the target traveling route P by using the traveling trajectory F acquired by the traveling trajectory acquisition portion 37. However, as shown in FIG. 16, the target traveling route P can be changed by using a stopped position J of the tractor 1. Therefore, as shown in FIG. 2, the terminal electronic control unit 30 includes the travel stop position acquisition portion 39 which acquires the stopped position J of the tractor 1 within the traveling region S. The traveling route changing portion 38 moves the target traveling route P such that the end edge H of the reference route P5 matches with the stopped position J acquired by the travel stop position acquisition portion 39. In the drawing of FIG. 16, the traveling route changing portion 38 acquires the target traveling route T after change by moving the target traveling route P in parallel in the extension direction X1 and the parallel arrangement direction X2 such that the end edge H of the reference route P5 matches with the stopped position J. Consequently, as the user or the like merely stops the tractor 1 at a place where he/she wishes to end the predetermined work, the traveling route changing portion 38 can acquire the target traveling route T after change in which the end edge H of the reference route P5 is matched with the stopped position J.

In the drawing of FIG. 16, the traveling route changing portion 38 moves the target traveling route P such that the end edge H of the reference route P5 matches with the stopped position J. However, the traveling route changing portion 38 can also move the target traveling route P such that the start edge of the reference route P5 matches with the stopped position J. Whether to match the end edge H of the reference route P5 with the stopped position J or match the start edge of the reference route P5 with the stopped position J can be selected by the user or the like by the operation on the liquid crystal panel 4, etc.

As can be seen, as illustrated in FIGS. 12 to 16, the traveling route changing portion 38 can change the target traveling route P, which has been set by the traveling route setting portion 32, to the target traveling route T, by various methods. For this reason, the user or like can select the method by which the traveling route changing portion 38 changes the target traveling route P by operating the liquid crystal panel 4, etc.

Figure 17:
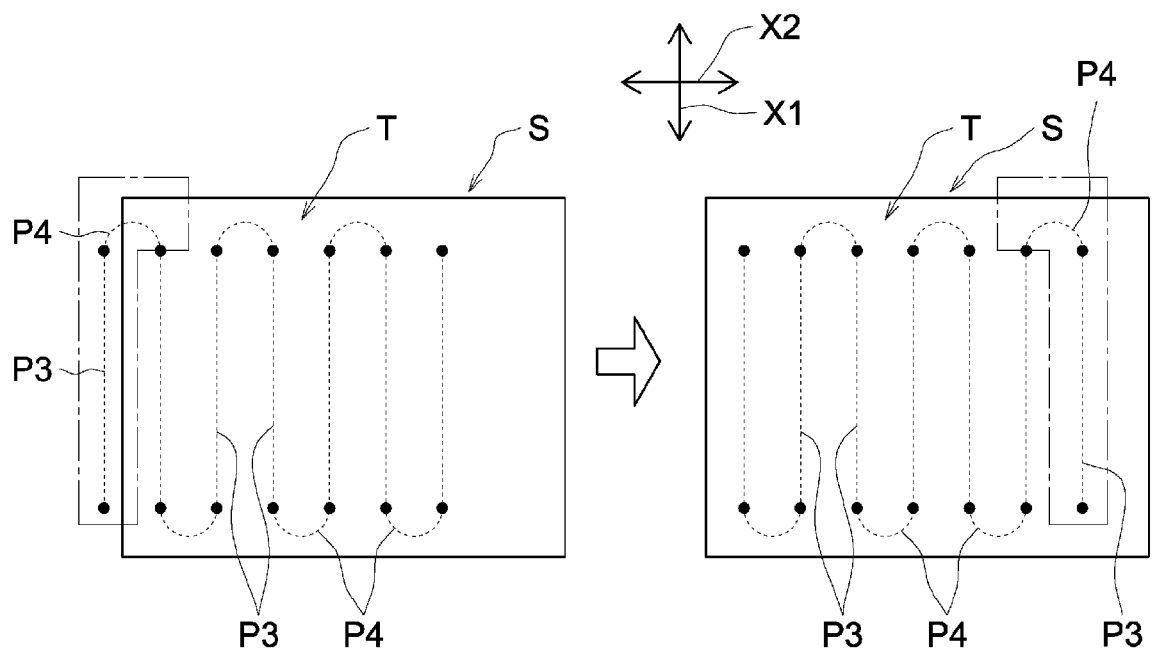
FIG. 17 is a schematic view showing the way to adjust a target traveling route after change.

As described above, the traveling route changing portion 38 can change the target traveling route to the target traveling route T after change by various methods. However, there may be a case where a part of the target traveling route T after change is located outside the traveling region S, as shown in FIG. 17. Thus, it is determined whether or not a part of the target traveling route T after change is located outside the traveling region S. If no part of the target traveling route T after change is located outside the traveling region S, the traveling route setting portion 32 changes and sets the target traveling route P to the target traveling route T after change (step #16 corresponding to the case of No in step #14, in FIG. 18). Also, if a part of the target traveling route T after change is located outside the traveling region S, adjustment of the target traveling route T after change is performed, and the traveling route setting portion 32 changes and sets the target traveling route P to the target traveling route T after change which has been adjusted (step #15 and step #16 corresponding to the case of Yes in step #14, in FIG. 18).

In order to adjust the target traveling route T after change, as shown in FIG. 2, the terminal electronic control unit 30 includes the traveling route adjusting portion 40 which deletes, when the target traveling route P is changed by the traveling route changing portion 38, the route located outside the traveling region S of the target traveling route T after change, and adds the deleted route to the target traveling route T after change within the traveling region S.

As shown on the left side of FIG. 17, when a part of the target traveling route T after change is located outside the traveling region S, the traveling route adjusting portion 40 specifies the route located outside the traveling region S, and deletes the specified route as a deletion route (i.e., the route surrounded by a dashed line in the drawing), as shown on the right side of FIG. 17. In the illustration on the left side of FIG. 17, the leftmost work route P3 and a single connection route P4 connected to the aforementioned work route P3 correspond to the deletion route. Not only does the traveling route adjusting portion 40 deletes the deletion route, but it also adds the deletion route (i.e., the route surrounded by the dashed line in the drawing) in a state of being continuous with the target traveling route T after change, on a side, which is opposite to the side on which the deletion route is deleted in the parallel arrangement direction X2, within the traveling region S, as shown on the right side of FIG. 17. In the illustration on the right side of FIG. 17, the connection route P4 connected to the rightmost work route P3 of the target traveling route T after change, and the work route P3 connected via the aforementioned connection route P4 is added.

As described above, the traveling route adjusting portion 40 can prevent the tractor 1 from running outside the traveling region S by deleting the route located outside the traveling region S. Moreover, in a case where a part of the target traveling route T after change is located outside the traveling region S, the target traveling route T after change is biased toward the side having the route that is located outside the traveling region S, in the traveling region S. In other words, there is a space where the target traveling route T is not generated, on a side opposite to the side having the route that is located outside the traveling region S, in the traveling region S. Accordingly, by adding the deleted route on the side opposite to the side having the route that is located outside the traveling region S in the traveling region S, the traveling route adjusting portion 40 can generate the target traveling route T over the entire traveling region S. Thus, even in a case where the target traveling route is changed to the target traveling route T after change by the traveling route changing portion 38, the target traveling route T can be set over the entire traveling region S.

Other Embodiments

The other embodiments of the present invention will be described.

The configurations of the respective embodiments described below are not necessarily applied independently, but may be applied in combination with the configurations of the other embodiments.

(1) The configuration of the working vehicle can be changed variously.

For example, the working vehicle may be configured to be of a hybrid specification equipped with the engine 10 and an electric motor for traveling, or may be configured to be of an electromotive specification equipped with an electric motor for traveling instead of the engine 10.

For example, the working vehicle may be configured to be of a semi-crawler specification equipped with left and right crawlers instead of the left and right rear wheels 8.

For example, the working vehicle may be configured to be of a rear-wheel steering specification in which the left and right rear wheels 8 serve as steering wheels.

(2) In the above embodiment, the traveling route setting portion 32 includes the initial route generation portion 32a, the work route generation portion 32b, and the connection route generation portion 32c. However, the initial route generation portion 32a, the work route generation portion 32b, and the connection route generation portion 32c may be omitted. In this case, for example, the traveling route setting portion 32 can automatically generate and set a plurality of work routes and a plurality of connection routes within the traveling region by using the car body data and the farm field data stored in the terminal storage portion 33. Then, as the traveling route changing portion 38 changes the target traveling route set by the traveling route setting portion 32, the set target traveling route can be changed to a target traveling route according to the request of the user or the like.

That is, as long as the traveling route changing portion 38 can change the target traveling route set by the traveling route setting portion 32, how the traveling route setting portion 32 sets the target traveling route can be changed as appropriate. That is, the traveling route setting portion 32 is not limited to one including the initial route generation portion 32a, the work route generation portion 32b, the connection route generation portion 32c, and the like.

(3) In the above embodiment, the traveling route changing portion 38 is capable of changing the target traveling route set by the traveling route setting portion 32. However, the traveling route changing portion 38 may be omitted. In other words, if a configuration for setting the target traveling route by the traveling route setting portion 32 including the initial route generation portion 32a, the work route generation portion 32b, the connection route generation portion 32c, etc., is adopted, it is not necessary to provide a structure for changing the target traveling route in the traveling route changing portion 38.

(4) The embodiment described above exemplifies a case where the traveling route setting portion 32 and the work region setting portion 34, etc., are provided in the terminal electronic control unit 30, and the traveling route setting device according to the present invention is provided in the portable communication terminal 3. However, the specific device or apparatus in which the traveling route setting device is to be provided can be changed as appropriate. For example, the traveling route setting portion 32 and the work region setting portion 34, etc., may be provided in the on-board electronic control unit 16, and the traveling route setting device may be provided in the tractor 1. Alternatively, a traveling route setting device including the traveling route setting portion 32 and the work region setting portion 34, for example, may be provided in an external management server, etc., which can freely communicate various kinds of information with the portable communication terminal 3 and the tractor 1.

INDUSTRIAL APPLICABILITY

The present invention can be applied to various traveling route setting devices for setting a target traveling route for making a working vehicle travel automatically.

DESCRIPTION OF REFERENCE NUMERALS

1 Tractor (Working vehicle)
32 Traveling route setting portion
32*a* Initial route generation portion
32*b* Work route generation portion
32*c* Connection route generation portion
34 Work region setting portion
35 Route exclusion portion
36 Reference route selection portion
37 Traveling trajectory acquisition portion
38 Traveling route changing portion
39 Travel stop position acquisition portion
40 Traveling route adjusting portion

The invention claimed is:
1. A traveling route setting device comprising:
a work region setting portion which sets, within a traveling region, a work region for a working vehicle to perform predetermined work; and
a traveling route setting portion which sets, within the traveling region, a target traveling route for travel guidance to make the working vehicle travel automatically, wherein
the traveling route setting portion comprises:
an initial route generation portion which generates an initial route based on a traveling trajectory formed by traveling of the working vehicle within the traveling region;
a work route generation portion which generates, based on the initial route, a plurality of work routes arranged in a state of being parallel to the initial route in a parallel arrangement direction orthogonal to a traveling direction of the initial route; and
a connection route generation portion which generates a plurality of connection routes each connecting, at one end side or the other end side of the work region, routes adjacent to each other in the parallel arrangement direction among the initial route and the plurality of work routes, and
the target traveling route including the initial route, the plurality of work routes, and the plurality of connection routes is set
wherein the work route generation portion generates an extended route by extending the initial route within the work region, and generates the plurality of work routes arranged in a state of being parallel to the extended route in the parallel arrangement direction.
2. The traveling route setting device according to claim 1, further comprising a route exclusion portion which excludes a route located outside the work region, among the initial route and the plurality of work routes, from the target traveling route.

* * * * *